(12) United States Patent
Dong et al.

(10) Patent No.: US 11,367,880 B2
(45) Date of Patent: Jun. 21, 2022

(54) BIPOLAR PLATE, CELL FRAME, BATTERY CELL, CELL STACK, AND REDOX FLOW BATTERY

(71) Applicant: SUMITOMO ELECTRIC INDUSTRIES, LTD., Osaka (JP)

(72) Inventors: Yongrong Dong, Osaka (JP); Hideki Miyawaki, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 44 days.

(21) Appl. No.: 16/627,984

(22) PCT Filed: Jun. 26, 2018

(86) PCT No.: PCT/JP2018/024185
§ 371 (c)(1),
(2) Date: Dec. 31, 2019

(87) PCT Pub. No.: WO2019/012984
PCT Pub. Date: Jan. 17, 2019

(65) Prior Publication Data
US 2020/0161669 A1 May 21, 2020

(30) Foreign Application Priority Data
Jul. 13, 2017 (JP) .............................. JP2017-137469

(51) Int. Cl.
H01M 4/36 (2006.01)
H01M 8/026 (2016.01)
(Continued)

(52) U.S. Cl.
CPC ......... *H01M 8/026* (2013.01); *H01M 8/0273* (2013.01); *H01M 8/188* (2013.01)

(58) Field of Classification Search
CPC .. H01M 8/026; H01M 8/0258; H01M 8/0273; H01M 8/0271; H01M 8/0247; H01M 8/188
See application file for complete search history.

(56) References Cited

U.S. PATENT DOCUMENTS

2018/0190999 A1 7/2018 Fujita et al.
2018/0277858 A1 9/2018 Fujita et al.

FOREIGN PATENT DOCUMENTS

EP 3 553 859 A1 10/2019
JP S58-5976 A 1/1983
(Continued)

OTHER PUBLICATIONS

Apr. 7, 2021 Extended Search Report issued in European Patent Application No. 18831020.5.
(Continued)

*Primary Examiner* — Raymond Alejandro
(74) *Attorney, Agent, or Firm* — Oliff PLC

(57) ABSTRACT

A bipolar plate to be arranged opposite to an electrode that is supplied with an electrolyte solution to cause a battery reaction includes a plurality of groove portions in which the electrolyte solution flows and rib portions that each separate the adjacent groove portions on at least one of its front and back surfaces. A specific rib portion including a contact surface to be brought into contact with the electrode and one or more recessed portions that are open in the contact surface is included among the rib portions.

16 Claims, 7 Drawing Sheets

(51) Int. Cl.
*H01M 8/0273* (2016.01)
*H01M 8/18* (2006.01)

(56) References Cited

FOREIGN PATENT DOCUMENTS

| JP | H08-96820 | A | 4/1996 | | |
|----|----|----|----|----|----|
| JP | 2003-142128 | A | 5/2003 | | |
| JP | 2005-158409 | A | 6/2005 | | |
| JP | 2015-122230 | A | 7/2015 | | |
| JP | 2015-122231 | A | 7/2015 | | |
| JP | 6108008 | | * 4/2017 | ............ | H01M 8/18 |
| JP | 6108008 | B1 | 4/2017 | | |
| WO | 2013/095378 | A1 | 6/2013 | | |
| WO | 2016/208482 | A1 | 12/2016 | | |
| WO | 2018/105648 | A1 | 6/2018 | | |

OTHER PUBLICATIONS

Sep. 4, 2018 Search Report issued in International Patent Application No. PCT/JP2018/024185.

\* cited by examiner

BIPOLAR PLATE, CELL FRAME, BATTERY CELL, CELL STACK, AND REDOX FLOW BATTERY

TECHNICAL FIELD

The present invention relates to a bipolar plate, a cell frame, a battery cell, a cell stack, and a redox flow battery.

The present application claims the benefit of priority based on Japanese Patent Application No. 2017-137469 filed on Jul. 13, 2017, which is incorporated herein by reference in its entirety.

BACKGROUND ART

A redox flow battery (also referred to as "RF battery" hereinafter) in which an electrolyte solution is supplied to electrodes to cause a battery reaction is a type of storage battery. As described in Patent Document 1, the RF battery includes, as a main component, a battery cell including a positive electrode to which a positive-electrode electrolyte is supplied, a negative electrode to which a negative-electrode electrolyte is supplied, and a membrane interposed between the electrodes. One battery cell has a configuration in which a stack obtained by arranging the positive electrode and the negative electrode on front and back sides of the membrane is interposed between two bipolar plates (FIG. 19 in Patent Document 1). In a multicellular battery including a plurality of battery cells, a bipolar plate, a positive electrode, a membrane, and a negative electrode are stacked in this order repeatedly, and the positive electrode and the negative electrode are arranged on the front side and the back side of each bipolar plate.

CITATION LIST

Patent Document

Patent Document 1: JP 2015-122230A

SUMMARY OF INVENTION

A bipolar plate of the present disclosure is a bipolar plate to be arranged opposite to an electrode that is supplied with an electrolyte solution to cause a battery reaction, including a plurality of groove portions in which the electrolyte solution flows and rib portions that each separate the adjacent groove portions on at least one of its front and back surfaces wherein a specific rib portion including a contact surface to be brought into contact with the electrode and one or more recessed portions that are open in the contact surface is included among the rib portions.

A cell frame of the present disclosure includes the above-mentioned bipolar plate of the present disclosure, and a frame body provided on an outer periphery of the bipolar plate.

A battery cell of the present disclosure includes the above-mentioned cell frame of the present disclosure, and an electrode.

A cell stack of the present disclosure includes the above-mentioned battery cell of the present disclosure.

A redox flow battery of the present disclosure includes the above-mentioned battery cell of the present disclosure, or the above-mentioned cell stack of the present disclosure.

DESCRIPTION OF EMBODIMENTS

Figure 1A:
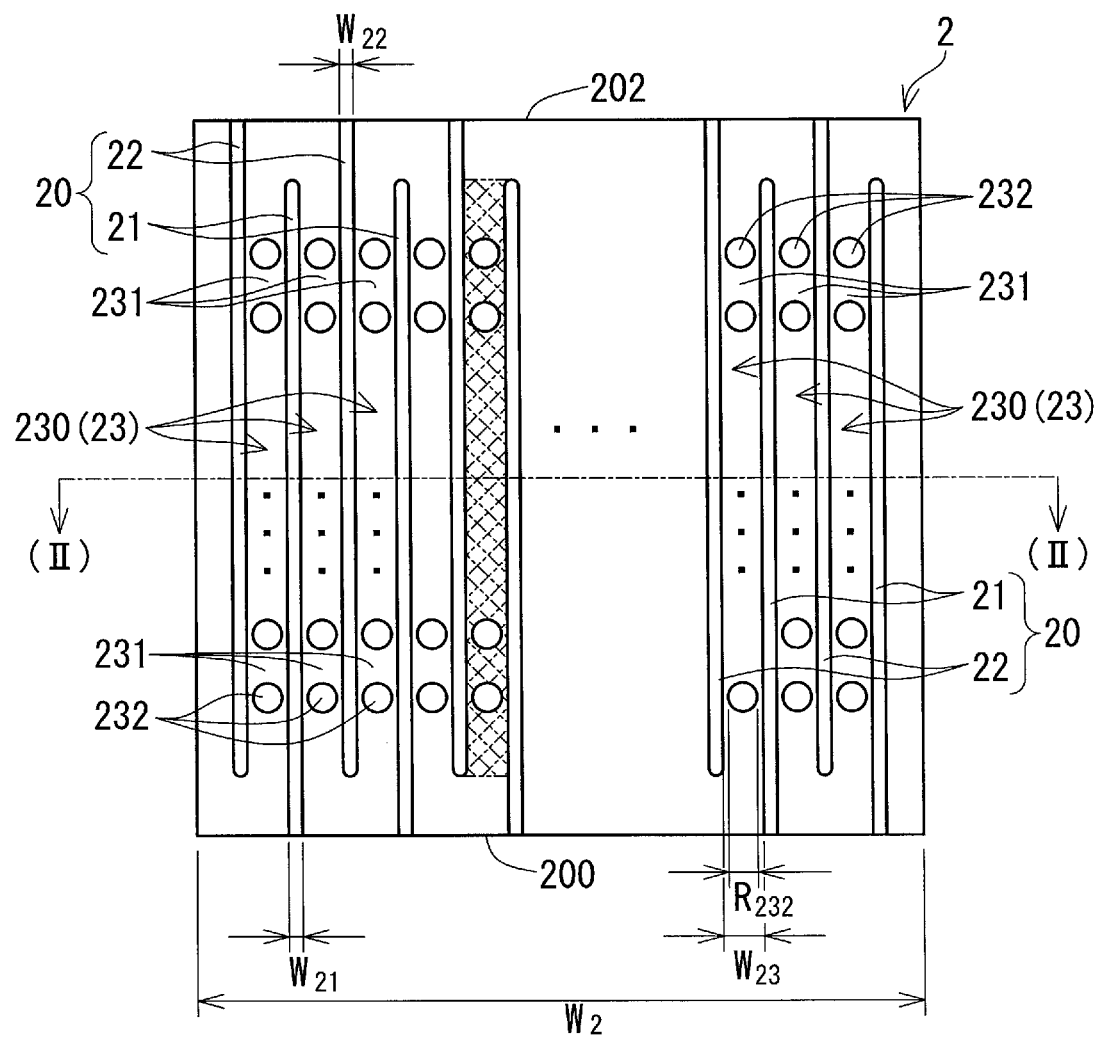
FIG. 1A is a schematic plan view of a bipolar plate of Embodiment 1.

Problem to be Solved by the Present Disclosure

There is demand for further improvement in the discharge capacity of a redox flow battery.

FIG. 1 in Patent Document 1 discloses that a plurality of groove portions in which an electrolyte solution flows are provided on the front and back surfaces of a bipolar plate. However, even if this bipolar plate with grooves is provided, it cannot be said that the discharge capacity is sufficiently improved. As shown in Test Example, which will be described later, it was found that, when a conventional RF battery including the above-mentioned bipolar plate with grooves is discharged with a particularly high output, the discharge duration is short, and the discharge capacity is significantly reduced. Therefore, an RF battery having a long discharge duration even when discharged with a high output and a large discharge capacity is desired.

To address this, an object of the present invention is to provide a bipolar plate that can increase discharge capacity. Another object is to provide a cell frame, a battery cell, a cell stack, and a redox flow battery that can increase discharge capacity.

Advantageous Effects of the Present Disclosure

The above-mentioned bipolar plate of the present disclosure, the above-mentioned cell frame of the present disclosure, the above-mentioned battery cell of the present disclosure, the above-mentioned cell stack of the present disclosure, and the above-mentioned redox flow battery of the present disclosure can increase discharge capacity.

DESCRIPTION OF EMBODIMENTS OF THE PRESENT INVENTION

First, embodiments of the invention of the present application will be listed and described.

(1) A bipolar plate according to an aspect of the present invention is a bipolar plate to be arranged opposite to an electrode that is supplied with an electrolyte solution to cause a battery reaction, the bipolar plate including a plurality of groove portions in which the electrolyte solution flows and rib portions that each separate the adjacent groove portions on at least one of its front and back surfaces, wherein a specific rib portion including a contact surface to be brought into contact with the electrode and one or more recessed portions that are open in the contact surface is included among the rib portions.

At least one of the front and back surfaces of the above-mentioned bipolar plate that is to be arranged opposite to the electrode includes the plurality of groove portions and the rib portions provided between the adjacent groove portions. With an RF battery including such a bipolar plate, a battery reaction can be efficiently caused because the groove portions of the bipolar plate can be used as supply passages for supplying the electrode with an electrolyte solution and discharge passages for discharging the electrolyte solution from the electrode, and regions (also referred to as "rib-facing regions" hereinafter) on the electrode corresponding to the rib portions of the bipolar plate can be used as reaction regions in which the battery reaction is caused. In addition, with this RF battery, a loss such as a pump loss can also be reduced because the flowability of the electrolyte solution is good due to the plurality of groove portions being provided. Accordingly, the above-mentioned bipolar plate is used as a constituent element of an RF battery and thus contributes to an improvement in the efficiency of a battery reaction, a reduction in a loss, and the like.

In addition, the above-mentioned bipolar plate includes the specific rib portions provided with the contact surface that comes into contact with the electrode and the recessed portions. As shown in Test Example, which will be described later, with an RF battery including such a bipolar plate, the discharge duration can be increased, and the discharge capacity can be increased, compared with a case where no specific rib portion is included. The reason for this is unclear, but it is thought that the reason is that the flow rate of the electrolyte solution can be changed depending on where the electrolyte solution flows, due to both the groove portions and the recessed portions being provided. Specifically, the flow rate of the electrolyte solution can be made relatively high in the groove portions and thus the flowability of the electrolyte solution is ensured, whereas the flow rate of the electrolyte solution can be made relatively low in the recessed portions and thus the electrolyte solution can be temporarily retained in the recessed portions. It is thought that the reason is that, since the electrode can be supplied with the electrolyte solution from the recessed portions, the diffusion resistance of the electrolyte solution can be reduced in the electrode, and thus the electrolyte solution can easily diffuse to the electrode, resulting in an efficient battery reaction. It is also thought that, since the above-mentioned contact surfaces are included, electrons can be favorably transferred between the electrode and the above-mentioned bipolar plate, and thus the discharge duration can be increased even when electricity is discharged with a high output. Details will be described later.

The above-mentioned bipolar plate can be used in both a single-cell battery including only one battery cell and a multicellular battery including a stack of a plurality of battery cells.

(2) In an embodiment of the above-mentioned bipolar plate, the groove portions include one or more introduction grooves for introducing the electrolyte solution and one or more discharge grooves for discharging the electrolyte solution, and a region in which the introduction groove, the specific rib portion, and the discharge groove are aligned in this order is provided.

The above-mentioned embodiment includes regions (also referred to as "specific uneven regions" hereinafter) in which three portions, namely the introduction groove, the specific rib portion, and the discharge groove, are aligned in the stated order. With such a bipolar plate, the introduction groove can be used as a passage for an unreacted electrolyte solution, and the discharge groove can be used as a passage for a reacted electrolyte solution used in the battery reaction. In addition, in the electrode arranged opposite to such a bipolar plate, the rib-facing regions corresponding to the rib portions including the specific rib portions that each separate the introduction groove and the discharge groove can be more reliably used as reaction regions in which the battery reaction is caused. Accordingly, with an RF battery including the bipolar plate of the above-mentioned embodiment, the electrode can be efficiently supplied with the electrolyte solution, the electrolyte solution can be efficiently discharged from the electrode, and the battery reaction can be efficiently caused. In particular, in the regions on the electrode corresponding to the specific rib portions out of the above-mentioned rib-facing regions, the electrolyte solution can be supplied from the recessed portions of the bipolar plate and easily diffuse, thus making it possible to cause the battery reaction even more efficiently. Moreover, since the specific rib portions include the contact surfaces, electrons can be favorably transferred between the electrode and the specific rib portions. Therefore, the above-mentioned embodiment contributes to an increase in the discharge capacity of an RF battery.

(3) In an embodiment of the above-mentioned bipolar plate of (2), in the specific rib portion interposed between the introduction groove and the discharge groove, a ratio of the total area of all of the recessed portions present in this specific rib portion in a plan view to the total area of the contact surface and all of the recessed portions in a plan view is 5% or more and 70% or less.

Since the above-mentioned embodiment includes the recessed portions in a range that satisfies the above-described area ratio, the rib-facing regions on the electrode can be appropriately secured and thus electrons can be favorably transferred between the contact surfaces of the specific rib portions and the electrode while an effect of improving the diffusibility of the electrolyte solution due to the above-described flow rate adjustment is obtained. Such an embodiment contributes to a further increase in the discharge capacity of an RF battery.

(4) An embodiment of the above-mentioned bipolar plate of (2) or (3) includes an interdigitated region in which the introduction grooves and the discharge grooves are alternately arranged, wherein the specific rib portion is included among the rib portions in the interdigitated region.

In the above-mentioned embodiment, the introduction grooves and the discharge grooves are alternately provided, and the specific uneven regions are also provided. With an RF battery including such a bipolar plate, the electrode can be efficiently supplied with the electrolyte solution, the electrolyte solution can be efficiently discharged from the electrode, and the battery reaction can be more efficiently caused. In addition, a further increase in the discharge capacity can be expected. In particular, if all of the rib portions provided in the interdigitated region are the specific rib portions, the above-described electrolyte solution can be even more efficiently supplied and discharged, and the battery reaction can be even more efficiently caused. In addition, an even further increase in the discharge capacity can be expected.

(5) In an embodiment of the above-mentioned bipolar plates, a recessed portion that is not open to the groove portion is included among the recessed portions.

The recessed portions that are not open to the groove portions have internal spaces that are independent of the internal spaces of the groove portions, and therefore, the flow rate of the electrolyte solution inside the recessed portions is likely to differ from the flow rate of the electrolyte solution inside the groove portions, thus making it easy to temporarily retain the electrolyte solution inside the recessed portions. Such an embodiment contributes to the construction of an RF battery with which an effect of improving the diffusibility of the electrolyte solution due to the above-described flow rate adjustment can be more easily obtained, and the battery reaction can be more efficiently caused.

(6) In an embodiment of the above-mentioned bipolar plates, the specific rib portion includes the recessed portions, and the total of the circumferential lengths of the recessed portions is longer than or equal to ¼ of the length of the specific rib portion.

Here, a case where a specific rib portion is provided with a single recessed portion (also referred to as "major recessed portion" hereinafter) in which the circumferential length of the edge of the opening provided in the contact surface is relatively long is compared with a case where a specific rib portion is provided with a plurality of recessed portions (also referred to as "minor recessed portions" hereinafter) in which the above-mentioned circumferential lengths are relatively short, and the total of the circumferential lengths of the minor recessed portions is the same as the circumferential length of the major recessed portion. It can be said that, in the later case where a plurality of minor recessed portions are provided, the contact surface and the recessed portions are likely to be present with better balance compared with the case where a single major recessed portion is provided. As a result, it is thought that the electrolyte solution can easily diffuse to the electrode, and in addition, the electron transfer between the contact surface of the specific rib portion and the electrode can be easily promoted. The above-mentioned embodiment includes the specific rib portions provided with a plurality of recessed portions and thus contributes to the construction of an RF battery with which the battery reaction can be more efficiently caused and the discharge capacity is increased.

(7) In an embodiment of the above-mentioned bipolar plates, the specific rib portion is the rib portion provided in a direction in which the electrolyte solution flows, and includes the recessed portions that are spaced apart from one another in the direction in which the electrolyte solution flows.

The above-mentioned embodiment includes the specific rib portions provided with a plurality of recessed portions, and therefore, the amount of the retained electrolyte solution can be easily increased compared with a specific rib portion providing with a single recessed portion. With an RF battery including such a bipolar plate, the electrolyte solution can easily diffuse to the electrode (particularly the rib-facing regions). Moreover, with the above-mentioned embodiment, the recessed portions are arranged in the direction in which the electrolyte solution flows, and therefore, the electrode arranged opposite to this bipolar plate can be provided with regions in which the electrolyte solution diffuses and that extend in the direction in which the electrolyte solution flows. Accordingly, with an RF battery including the bipolar plate of the above-mentioned embodiment, the battery reaction can be caused more reliably and more efficiently, and the discharge capacity can be more easily increased. In addition, the groove portions that are separated by the specific rib portions of the above-mentioned embodiment are provided extending in the direction in which the electrolyte solution flows, and therefore, with the above-mentioned embodiment, the flowability of the electrolyte solution is improved.

(8) In an embodiment of the above-mentioned bipolar plates, the minimum width of the specific rib portion is larger than or equal to the minimum width of openings of the groove portions.

Since the above-mentioned embodiment includes the relatively wide specific rib portions, these specific rib portions can be provided with large recessed portions or a larger number of recessed portions, and thus the amount of retained electrolyte solution can be easily increased. Accordingly, with an RF battery including the bipolar plate of the above-mentioned embodiment, the electrolyte solution can easily diffuse to the electrode (particularly the rib-facing regions), and the discharge capacity can be easily increased.

(9) A cell frame according to an aspect of the invention of the present application includes the bipolar plate according to any one of (1) to (8) above, and a frame body provided on an outer periphery of the bipolar plate.

The above-mentioned cell frame includes the above-mentioned bipolar plate provided with the above-described groove portions and the rib portions including the specific rib portions. Therefore, when used as a constituent element of an RF battery, the cell frame contributes to an improvement in the efficiency of a battery reaction and a reduction in a loss, and in addition, the discharge capacity can be increased.

(10) A battery cell according to an aspect of the invention of the present application includes the cell frame according to (9) above, and an electrode.

The above-mentioned battery cell includes the above-mentioned bipolar plate provided with the above-described groove portions and the rib portions including the specific rib portions. Therefore, when used as a constituent element of an RF battery, the battery cell contributes to an improvement in the efficiency of a battery reaction and a reduction in a loss, and in addition, the discharge capacity can be increased.

(11) In an example of the above-mentioned battery cell, the electrode has a thickness of 50 µm or more and 1 mm or less.

With the above-mentioned embodiment, a thin RF battery can be constructed.

(12) A cell stack according to an aspect of the invention of the present application includes the battery cell according to (10) or (11) above.

The above-mentioned cell stack includes the above-mentioned bipolar plate provided with the above-described groove portions and the rib portions including the specific rib portions. Therefore, when used as a constituent element of an RF battery, the cell stack contributes to an improvement in the efficiency of a battery reaction and a reduction in a loss, and in addition, the discharge capacity can be increased.

(13) A redox flow battery according to an aspect of the invention of the present application includes the battery cell according to (10) or (11) above, or the cell stack according to (12) above.

The above-mentioned RF battery includes the above-mentioned bipolar plate provided with the above-described groove portions and the rib portions including the specific rib portions. Therefore, the battery reaction can be efficiently caused and a loss can be reduced. In addition, the discharge capacity can be increased compared with a conventional RF battery that does not include the above-described specific rib portions.

(14) An example of the above-mentioned RF battery includes a positive-electrode electrolyte containing at least one of a manganese ion, a vanadium ion, an iron ion, a polyoxometalate, a quinone derivative, and an amine as a positive-electrode active material.

With the above-mentioned embodiment, an RF battery includes the positive-electrode electrolyte containing the positive-electrode active material listed above can be constructed, and the discharge capacity can be increased compared with a conventional RF battery that does not include the above-described specific rib portions.

(15) In an example of the above-mentioned RF battery includes a negative-electrode electrolyte containing at least one of a titanium ion, a vanadium ion, a chromium ion, a polyoxometalate, a quinone derivative, and an amine as a negative-electrode active material.

With the above-mentioned embodiment, an RF battery including the negative-electrode electrolyte containing the negative-electrode active material listed above can be constructed, and the discharge capacity can be increased compared with a conventional RF battery that does not include the above-described specific rib portions.

DETAILS OF EMBODIMENTS OF THE PRESENT INVENTION

Hereinafter, embodiments of the invention of the present application will be specifically described with reference to the drawings. In the figures, components having the same name are denoted by the same reference numeral.

Embodiment

Bipolar Plate

A bipolar plate 2 of Embodiment 1 will be described with reference to FIGS. 1A, 1B, and 2.

Figure 2:
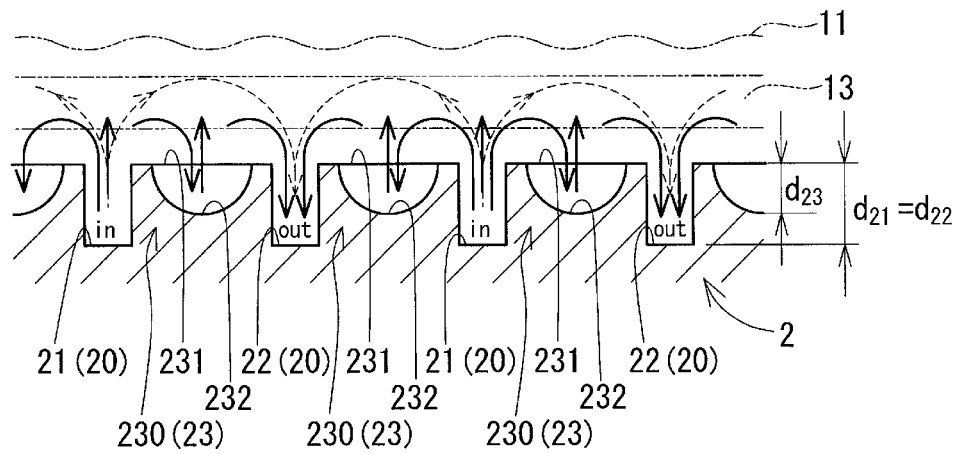
FIG. 2 is a schematic partial cross-sectional view of the bipolar plate of Embodiment 1 taken along line (II)-(II) shown in FIG. 1A.

In FIGS. 1A and 2, groove portions 20 and rib portions 23 are emphasized to facilitate understanding and may not satisfy dimensions described later. The same applies to FIGS. 3 to 6, which will be described later.

Figure 1B:
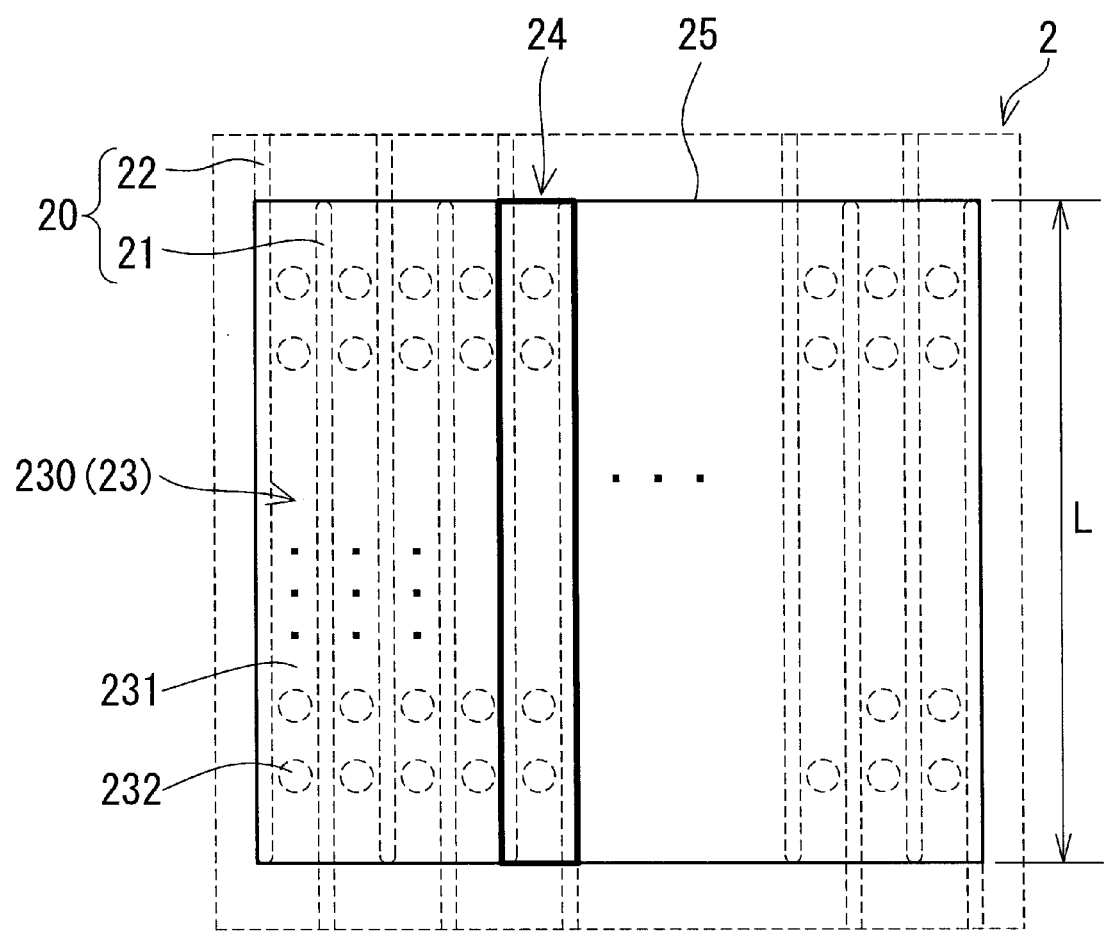
FIG. 1B is an explanatory diagram for explaining regions and the like in the bipolar plate of Embodiment 1.

FIG. 1B shows the same plan view as FIG. 1A. In FIG. 1B, the bipolar plate 2 is indicated by a dotted line, and regions of the bipolar plate 2 are indicated by a solid line or a thick solid line, for convenience of illustration of the regions and the like.

FIG. 2 is a cross-sectional view of the bipolar plate 2 shown in FIG. 1A cut in the thickness direction (the direction orthogonal to the plane of FIG. 1A). In FIG. 2, an electrode 13 and a membrane 11 are virtually indicated by a two-dot chain line, and the electrode 13 and the membrane 11 are spaced apart from the bipolar plate 2 to facilitate understanding of the bipolar plate 2. The same applies to FIGS. 4 and 6, which will be described later.

Outline

The bipolar plate 2 of Embodiment 1 is typically a conductive flat plate member that can carry an electric current but does not allow an electrolyte solution to pass therethrough. A cell frame 12 (FIG. 8) is formed by providing a frame body 120 (see FIG. 8, which will be described later) so as to cover the peripheral edge region of the bipolar plate 2, and is used as a constituent element of an RF battery. As shown in FIG. 2, the bipolar plate 2 is arranged opposite to the electrode 13 that is supplied with an electrolyte solution to cause a battery reaction when the bipolar plate 2 is assembled in an RF battery.

As shown in FIG. 1A, the bipolar plate 2 of Embodiment 1 includes a plurality of groove portions 20 in which an electrolyte solution flows and rib portions 23 that each separate adjacent groove portions 20 on at least one of the front and back surfaces that is to be arranged opposite to the electrode 13. Typically, the internal region of the bipolar plate 2 excluding the peripheral edge region to be covered by the frame body 120 is exposed from a window portion of the frame body 120, and the electrode 13 is mainly arranged thereon (see FIG. 8). FIG. 1A shows the internal region of the bipolar plate 2 to be exposed from the window portion of the frame body 120, and the peripheral edge region is omitted. FIG. 1A shows, as an example, the case where a plurality of groove portions 20 and a plurality of rib portions 23 are provided in the above-mentioned internal region, but the groove portions 20 and the rib portions 23 may also be provided in the entire bipolar plate 2 including the above-described peripheral edge region.

The bipolar plate 2 of Embodiment 1 has a configuration in which the entire region of each rib portion 23 to be arranged opposite to the electrode 13 is not constituted by a smooth even surface, and recessed portions 232 are locally provided in the rib portions 23. Specifically, in the bipolar plate 2 of Embodiment 1, a specific rib portion 230 including a contact surface 231 that comes into contact with the electrode 13 and one or more recessed portions 232 that are open in the contact surface 231 is included among the rib portions 23.

As shown in FIGS. 1A and 1B, the bipolar plate 2 of this embodiment is further configured as follows.

(1) One or more introduction grooves 21 for introducing an electrolyte solution and one or more discharge grooves 22 for discharging the electrolyte solution are included among the groove portions 20, and a region (specific uneven region 24; the longitudinal rectangular region surrounded by a thick solid line in FIG. 1B) in which an introduction groove 21, a specific rib portion 230, and a discharge groove 22 are aligned in this order is provided.

(2) An interdigitated region 25 (the rectangular region surrounded by a solid line in FIG. 1B) in which the introduction grooves 21 and the discharge grooves 22 are alternately arranged is provided, and the specific rib portion 230 is included among the rib portions 23 present in the interdigitated region 25.

(3) The specific rib portion 230 is a rib portion 23 that is provided extending in a direction in which the electrolyte solution flows and includes a plurality of recessed portions 232 that are spaced apart from each other in the direction in which the electrolyte solution flows.

FIG. 1A shows, as an example, the case where all of the rib portions 23 are the specific rib portions 230, and each of the specific rib portions 230 is provided with a plurality of recessed portions 232 at intervals.

In addition, in this embodiment, the internal region of the bipolar plate 2 to be exposed from the frame body 120 has a rectangular shape in a plan view. In the following description, out of four sides constituting the peripheral edge of this region, the lower edge shown in FIG. 1A is taken as a supply edge 200 arranged on a side from which the electrolyte solution is supplied, and the upper edge is taken as a discharge edge 202 arranged on a side from which the electrolyte solution is discharged toward the outside of the bipolar plate 2. In this case, the electrolyte solution flows mainly from the supply edge 200 side to the discharge edge 202 side. In the following description of this embodiment, the vertical direction in FIG. 1A is taken as the direction in which the electrolyte solution flows.

Groove Portion

The groove portions 20 provided in the bipolar plate 2 function as passages for an electrolyte solution. For example, as shown in FIG. 1A, the groove portions 20 may be linear grooves extending in the same direction (here, the direction in which the electrolyte solution flows), and may be aligned in parallel at predetermined intervals. Here, as shown in FIG. 1A, the case where the groove portions 20 have substantially the same groove lengths, groove widths $W_{21}$ and $W_{22}$, and groove depths $d_{21}$ and $d_{22}$ (FIG. 2), and the groove portions 20 are provided at regular intervals in a direction extending along a width $W_2$ of the bipolar plate 2 is shown as an example. Also, here, the case where the groove widths $W_{21}$ and $W_{22}$, and the groove depths $d_{21}$ and $d_{22}$, respectively, of the groove portions 20 are substantially equal over the entire region in the longitudinal direction, and the groove portions 20 have an elongated rectangular shape in a plan view is shown as an example. The bipolar plate 2 of this embodiment as described above exhibit the following effects (a) to (d).

(a) The flow pressure of the electrolyte solution is not likely to fluctuate inside the groove portions 20, and the flowability of the electrolyte solution is good.

(b) Depending on the groove widths $W_{21}$ and $W_{22}$ and the like, the number of groove portions 20 can be easily increased, and the flowability of the electrolyte solution is improved.

(c) The rib portions 23 that each separate adjacent groove portions 20 also have an elongated rectangular shape extending along the shape of the groove portions 20 in the direction in which the electrolyte solution flows, and the widths $W_{23}$ thereof do not substantially change over the entire region in the longitudinal direction. The rib-facing regions in the electrode 13 corresponding to the above-mentioned rib portions 23 are also provided in the direction in which the electrolyte solution flows, thus making it possible to secure wide reaction regions in which a battery reaction is caused and to favorably cause the battery reaction.

(d) The shape is simple despite the groove portions 20 and the rib portions 23 being provided, and thus the productivity is good.

It should be noted that the above-described groove length refers to the size of the groove portion 20 in the direction in which the electrolyte solution flows. The groove widths $W_{21}$ and $W_{22}$, the width $W_2$ of the bipolar plate 2, and widths $W_{23}$ (which will be described later) of the rib portions 23 including the specific rib portions 230 refer to sizes in a direction orthogonal to the direction in which the electrolyte solution flows (lengths in the horizontal direction in FIG. 1A). The groove depths $d_{21}$ and $d_{22}$, and the depths $d_{23}$ (which will be described later) of the recessed portions 232 refer to sizes in the thickness direction of the bipolar plate 2 (vertical direction in FIG. 2). The groove widths $W_{21}$ and $W_{22}$ also refer to sizes in a direction orthogonal to both the groove lengths and the groove depths $d_{21}$ and $d_{22}$. The groove lengths, the groove widths $W_{21}$ and $W_{22}$, and the groove depths $d_{21}$ and $d_{22}$ can be selected as appropriate depending on the length (which refers to the length in the direction in which the electrolyte solution flows, namely the size in the vertical direction in FIG. 1A), the width $W_2$, and the thickness of the bipolar plate 2, the number of groove portions 20, the sizes of the rib portions 23, and the like. The shapes of the groove portions 20 in a plan view can also be changed as appropriate. Although the groove portions 20 have a rectangular cross-sectional shape as shown in FIG. 2 in this embodiment, the cross-sectional shape can be changed as appropriate.

In a quantitative manner, the groove lengths of the groove portions 20 may be set to 70% or more and 95% or less, or 80% or more and 90% or less, of the length of the bipolar plate 2, for example. The groove widths $W_{21}$ and $W_{22}$ of the groove portions 20 may be set to 0.1% or more and 5% or less, or 0.5% or more and 3% or less, of the width $W_2$ of the bipolar plate 2, for example. The length and width $W_2$ of the bipolar plate 2 refer to the length and width of the internal region of the bipolar plate 2 to be exposed from the frame body 120. The groove depths $d_{21}$ and $d_{22}$ of the groove portions 20 may be set to 10% or more and 45% or less, or 10% or more and 35% or less, of the thickness of the bipolar plate 2, for example. If the groove depths $d_{21}$ and $d_{22}$ satisfy the above-mentioned ranges, a decrease in mechanical strength can be easily suppressed even when the groove portions 20 are provided on the front and back surfaces of the bipolar plate 2, and thus a bipolar plate 2 having good strength can be obtained.

It is preferable that the introduction groove 21 and the discharge groove 22, which are independent of each other, are included among the groove portions 20 as in this embodiment because it is possible to both efficiently supply the electrode 13 with an unreacted electrolyte solution from the introduction groove 21 and to efficiently discharge a reacted electrolyte solution used in the battery reaction in the electrode 13 from the electrode 13. The term "the introduction groove 21 and the discharge groove 22 are independent of each other" means that the introduction groove 21 and the discharge groove 22 are provided such that the electrolyte solution flowing in the introduction groove 21 and the electrolyte solution flowing in the discharge groove 22 do not mix together on the bipolar plate 2 as well as at the supply edge 200 and the discharge edge 202. Typically, each of the introduction grooves 21 may be a closed-terminal-end groove, which will be described later, and each of the discharge grooves 22 may be a closed-leading-end groove, which will be described later.

For example, the introduction groove 21 may be a closed-terminal-end groove that is a groove portion 20 in which one end is open at the supply edge 200 and the other end is closed at a position spaced apart from the one end thereof. The one end of the introduction groove 21 serves as an inlet for the electrolyte solution. When the "position spaced apart from the one end" in the introduction groove 21 is located near the discharge edge 202 as shown in FIG. 1A, for example, the groove length is long, the flowability of the electrolyte solution is good, and thus the electrolyte solution can easily diffuse over a wide range on the electrode 13. For example, the position located near the discharge edge 202 may be a position located in a range from the discharge edge 202 to a position spaced apart therefrom by 15% of the length of the bipolar plate 2 in the direction in which the electrolyte solution flows.

For example, the discharge groove 22 may be a closed-leading-end groove that is a groove portion 20 in which one end is open at the discharge edge 202 and the other end is closed at a position spaced apart from the one end thereof. The one end of the discharge groove 22 serves as an outlet for the electrolyte solution. When the "position spaced apart from the one end" in the discharge groove 22 is located near the supply edge 200 as shown in FIG. 1A, for example, the groove length is long, the flowability of the electrolyte solution is good, and thus the reacted electrolyte solution can be easily discharged. For example, the position located near the supply edge 200 may be a position located in a range from the supply edge 200 to a position spaced apart therefrom by 15% of the length of the bipolar plate 2 in the direction in which the electrolyte solution flows.

Alternatively, a configuration is also possible in which the bipolar plate 2 is provided with a rectifying groove (not shown) extending along the supply edge 200, and each of the introduction grooves 21 is a closed-terminal-end groove in which one end is open to this rectifying groove, for example. In addition, a configuration is also possible in which the bipolar plate 2 is provided with a rectifying groove (not shown) extending along the discharge edge 202, and each of the discharge grooves 22 is a closed-leading-end groove in which one end is open to this rectifying groove, for example.

Alternatively, a configuration is also possible in which each of the introduction grooves 21 is a two-open-end groove in which one end is open at the supply edge 200 or to the rectifying groove on the supply edge 200 side and the other end is open at the discharge edge 202 or to the rectifying groove on the discharge edge 202 side, for example (see FIG. 3, which will be described later). In addition, a configuration is also possible in which each of the discharge grooves 22 is a two-open-end groove in which one end is open at the discharge edge 202 or to the rectifying groove on the discharge edge 202 side and the other end is open at the supply edge 200 or to the rectifying groove on the supply edge 200 side, for example (see FIG. 3, which will be described later). With a two-open-end groove, even if the electrolyte solution is contaminated with impurities and the like, the impurities and the like can be easily discharged from the electrode 13, thus making it easy to prevent the impurities and the like from attaching to and clogging the electrode 13.

When the above-described two-open-end groove is provided as the introduction groove 21, it is provided such that the amount of electrolyte solution flowing from the inlet provided on the supply edge 200 side is larger than the amount of electrolyte solution discharged from the outlet provided on the discharge edge 202 side. Moreover, when the above-described two-open-end groove is provided as the discharge groove 22, it is provided such that the amount of electrolyte solution discharged from the outlet provided on the discharge edge 202 side is larger than the amount of electrolyte solution flowing from the inlet provided on the supply edge 200 side. Specifically, in the two-open-end groove, the size (the groove width, the groove depth, the cross-sectional area, or the like) of the region on the inlet side may be different from the size (the groove width, the groove depth, the cross-sectional area, or the like) of the region on the outlet side. For example, as virtually indicated by a two-dot chain line in FIG. 3, the groove width $W_{21}$ on the inlet side may be larger than the groove width Wo on the outlet side in the introduction groove 21. The groove width $W_{22}$ on the outlet side may be larger than the groove width Wi on the inlet side in the discharge groove 22.

Alternatively, instead of the above-described configuration in which the groove width or the like of each of the two-open-end grooves locally varies, a configuration may be employed in which the size (the groove width, the groove depth, the cross-sectional area, or the like) of the two-open-end groove continuously or gradually changes from the inlet toward the outlet. For example, the cross-sectional area or the like of the introduction groove 21 may decrease from the inlet toward the outlet. The cross-sectional area or the like of the discharge groove 22 may decrease from the outlet toward the inlet. The maximum value of the groove width, groove depth, or cross-sectional area may be set to be approximately greater than the minimum value and smaller than or equal to twice the minimum value.

Alternatively, instead of the above-described configuration in which the groove width or the like on the inlet side is different from that on the outlet side in each of the two-open-end grooves, a configuration may be employed in which the region on the outlet side of each of the introduction grooves 21 is provided with an obstruction for hindering discharge of the electrolyte solution. The region on the inlet side of each of the discharge grooves 22 is provided with an obstruction for hindering introduction of the electrolyte solution.

The above-described closed-leading-end grooves, closed-terminal-end grooves, and two-open-end grooves can be formed by providing the groove portions 20 such that one end and optionally the other end of each of the introduction grooves 21 and discharge grooves 22 are open at the inner peripheral edge of the frame body 120 that forms the window portion in a state in which the bipolar plate 2 is assembled in the cell frame 12.

In addition, for example, each of the introduction grooves 21 may be a two-closed-end groove in which one end is closed near the supply edge 200 and the other end is closed at a position that is relatively close to the discharge edge 202. In this case, in the introduction groove 21, the distance between the supply edge 200 and the one end is larger than the distance between the discharge edge 202 and the other end. Moreover, for example, each of the discharge grooves 22 may be a two-closed-end groove in which one end is closed near the discharge edge 202 and the other end is closed at a position that is relatively close to the supply edge 200. In this case, in the discharge groove 22, the distance between the discharge edge 202 and the one end is larger than the distance between the supply edge 200 and the other end. It should be noted that, when the above-described closed-leading-end grooves and closed-terminal-end grooves are provided as the introduction grooves 21 and the discharge grooves 22, the electrolyte solution can be favorably supplied and discharged, and the flowability of the electrolyte solution is good, compared with the case where the two-closed-end grooves are provided.

Any of the above-described closed-leading-end groove, closed-terminal end groove, two-open-end groove, and two-closed-end groove can be employed as the introduction grooves 21 and the discharge grooves 22, and it can thus be said that the cross-sectional area of the end on the supply edge 200 side can be varied in a range approximately between 0% or more and 200% or less of the cross-sectional area of the end on the discharge edge 202 side.

It is preferable that a plurality of introduction grooves 21 and a plurality of discharge grooves 22 are included among the groove portions 20, and the interdigitated region 25 in which the introduction grooves 21 and the discharge grooves 22 are alternately arranged is provided because an unreacted electrolyte solution can be more efficiently supplied, the battery reaction can be more efficiently caused, and the reacted electrolyte solution can be more efficiently discharged. Specifically, when the electrode 13 arranged on the bipolar plate 2 including the interdigitated region 25 receives an unreacted electrolyte solution from the introduction grooves 21, the battery reaction can be caused on the rib-facing regions of the electrode 13 that correspond to the rib portions 23. In addition, with this electrode 13, the electrolyte solution used in the battery reaction can be discharged from the above-mentioned rib-facing regions to the adjacent discharge grooves 22.

The larger the area ratio of the interdigitated region 25 in the internal region that is present on one surface of the bipolar plate 2 and is to be exposed from the frame body 120 is, the more easily more regions (rib-facing regions) on which the battery reaction is caused can be secured on the electrode 13, and the more efficiently an electrolyte solution can be supplied to this region and the more efficiently the reacted electrolyte solution can be discharged from these regions. The above-mentioned area ratio may be 60% or more, or 70% or more, or 80% or more, for example. It is sufficient that the groove lengths of the groove portions 20, the number thereof, and like are adjusted such that the above-mentioned area ratio satisfies the above-described range.

Rib Portion

The rib portions 23 provided in the bipolar plate 2 are used as regions where electrons are delivered to and received from the electrode 13, are used to separate adjacent groove portions 20, and contribute to ensuring the flowability of the electrolyte solution and securing regions on the electrode 13 in which the battery reaction is caused.

Each of the rib portions 23 is interposed between adjacent groove portions 20 and thus typically has a shape extending along these groove portions 20 in a plan view. The rib portions 23 of this embodiment have an elongated rectangular shape in a plan view, but the shape can be changed as appropriate depending on the shapes of the adjacent groove portions 20.

The bipolar plate 2 of Embodiment 1 includes specific rib portions 230 including a contact surface 231 and a recessed portion 232. It is thought that, in a state in which the bipolar plate 2 is assembled in an RF battery, the contact surface 231 functions as a portion where electrons are delivered to and received from the electrode 13, and the recessed portion 232 functions to temporarily retain the electrolyte solution and supply the retained electrolyte solution to the electrode 13. These functions and effects will be described in detail with reference to FIG. 2.

First, a case where no recessed portions 232 are provided will be described. In this case, as indicated by broken line arrows in FIG. 2, the electrolyte solution flowing in one groove portion 20 (introduction groove 21 here) of adjacent groove portions 20 separated by a certain rib portion 23 passes over a portion of the electrode 13 corresponding to this groove portion 20, is supplied to a region adjacent to this portion, that is, the rib-facing region corresponding to the rib portion 23, and is used in the battery reaction. The reacted electrolyte solution used in the battery reaction is discharged from the above-described rib-facing region of the electrode 13 via a portion of the electrode 13 corresponding to the other groove portion 20 (discharge groove 22 here) to the other groove portion 20.

Here, it is considered that the quantity of flow of the electrolyte solution is increased in order to perform high output by increasing a discharge current and to increase the discharge capacity, for example. In this case, the amount of electrolyte solution supplied to the rib-facing region can be increased, and as a result, the amount of an active material that can be supplied to the electrode 13 can be increased. Therefore, theoretically, electrons can be sufficiently transferred between the electrolyte solution and the electrode 13 and thus between the electrode 13 and the bipolar plate 2, thus making it possible to increase the discharge duration. However, in practice, even if the quantity of flow of the electrolyte solution is increased, the electrolyte solution will flow in the groove portions 20 with electrons being insufficiently transferred between the electrolyte solution and the electrode 13. That is, the electrolyte solution cannot sufficiently diffuse to the electrode 13, and thus the amount of active material supplied to the electrode 13 cannot be increased, as a result of which the discharge duration may decrease. An increase in the quantity of flow of the electrolyte solution may cause a pressure loss, and therefore, there is a limit to the increase in the quantity of flow.

On the other hand, in the case where the bipolar plate 2 includes the recessed portions 232, the electrolyte solution can be temporarily retained in the recessed portions 232 of the specific rib portions 230 via the electrode 13 as indicated by solid line arrows in FIG. 2 during the process in which the electrolyte solution is supplied to the electrode 13 (rib-facing region) from the one groove portion 20 (introduction groove 21) as described above, and the electrolyte solution is discharged from the other groove portion 20 (discharge groove 22) after the battery reaction. Moreover, the retained electrolyte solution can be supplied to a region of the electrode 13 that faces the rib from the recessed portions 232 of the bipolar plate 2. It is thought that the electrolyte solution can be supplied to the electrode 13 (regions facing the rib) from the groove portions 20 as well as the recessed portions 232, and the electrolyte solution can thus more easily diffuse to the electrode 13 (the sufficient duration of time for which the electrolyte solution diffuses can be easily ensured), thus making it possible to more reliably cause the battery reaction. It is thought that, even when the flow rate of the electrolyte solution is made relatively large in the groove portions 20 by increasing the quantity of flow of the electrolyte solution, the flow rate of the electrolyte solution in the recessed portions 232 can be reduced compared with that in the groove portions 20 and thus the electrolyte solution can also be supplied to the electrode 13 from the recessed portions 232, thus making it easy to sufficiently ensure the above-mentioned diffusion duration. In addition, it is thought that, in the bipolar plate 2, one rib portion 23 includes the contact surface 231 that is locally provided with the recessed portions 232 and comes into contact with the electrode 13, and therefore, the contact area between the contact surface and the electrode 13 can be secured, thus making it possible to more reliably transfer electrons between the bipolar plate 2 and the electrode 13. That is, it is thought that electrons can be easily transferred between the bipolar plate 2 and the electrode 13.

Here, focusing on the electron transfer between the bipolar plate 2 and the electrode 13, it can be said that the configuration in which the contact surfaces 231 of the rib portions 23 to be brought into contact with the electrode 13 are provided with the recessed portions 232 is a configuration in which the contact area between the contact surface and the electrode 13 is reduced and it is difficult to transfer electrons between the bipolar plate 2 and the electrode 13. However, in the specific rib portions 230, the recessed portions 232 are locally provided and thus the contact surface 231 is secured, thus making it possible to improve the diffusibility of the electrolyte solution while ensuring favorable electron transfer between the bipolar plate 2 and the electrode 13.

When the above-described functions are taken into consideration, it is preferable that the recessed portions 232 are not open to the groove portions 20 separated by the specific rib portions 230, but are only open in the contact surfaces 231 as shown in examples in FIGS. 1A and 2. That is, it is preferable that the edges of the openings of the recessed portions 232 are present inside the contact surfaces 231 and are completely independent of the edges of the openings of the groove portions 20. The reason for this is that such recessed portions 232 serve as blind holes that can retain the electrolyte solution independently of the groove portions 20, and therefore, the flow rate of the electrolyte solution in the recessed portions 232 can be reliably reduced compared with the flow rate of the electrolyte solution in the groove portions 20, thus making it easy to temporarily retain the electrolyte solution in the recessed portions 232. In addition, when the above-described functions are taken into consideration, it is preferable to satisfy at least one of the condition that one specific rib portion 230 is provided with a plurality of recessed portions 232 (FIG. 1A) and a condition that a plurality of specific rib portions 230 provided with the recessed portion 232 are included (FIG. 1A) because the electrolyte solution can be more reliably retained. It is more preferable that both of the above-described conditions are satisfied as in this embodiment. It should be noted that, as shown in Embodiments 2 and 3, which will be described later, a configuration can be employed in which the edges of the openings of the recessed portions 232 are in contact with or intersect the edges of the openings of the groove portions 20.

The shapes in a plan view, sizes of openings (e.g., opening areas, opening diameters $R_{232}$ (FIG. 1A), and opening widths), depths $d_{23}$ (FIG. 2), cross-sectional shapes, and number of recessed portions 232, the intervals between the adjacent recessed portions 232, and the like can be selected as appropriate as long as the above-described functions are exhibited. FIGS. 1A and 2 show examples having a configuration in which the recessed portions 232 have the same shape with the same dimensions, and are provided at regular intervals in the specific rib portions 230. Also, in the examples, the recessed portions 232 have a hemispherical shape (with a circular shape in a plan view (FIG. 1A) and a semicircular cross-sectional shape (FIG. 2)), and have an opening diameter $R_{232}$ (corresponding to the maximum width here) that is smaller than the widths $W_{23}$ of the specific rib portions 230 and larger than the groove widths $W_{21}$ and $W_{22}$ of the groove portions 20, and have a depth $d_{23}$ that is smaller than the depths $d_{21}$ and $d_{22}$ of the groove portions 20. With an RF battery including the bipolar plate 2 of this embodiment, the discharge capacity can be easily increased.

The formability of semicircular recessed portions 232 is good. Since the opening diameter $R_{232}$ is smaller than the width $W_{23}$, the edges of the openings of the recessed portions 232 are reliably present inside the contact surfaces 231. Since the opening diameter $R_{232}$ is larger than the groove widths $W_{21}$ and $W_{22}$, the amount of retained electrolyte solution can be easily increased to some extent and the electrolyte solution can easily diffuse to the electrode 13 even when the depth $d_{23}$ is relatively small (here, the depth $d_{23}$ is smaller than the depths $d_{21}$ and $d_{22}$). The opening diameter $R_{232}$ of the recessed portions 232 or the maximum width of the recessed portions 232 may be 10% or more and 90% or less, or 15% or more and 85% or less, or 20% or more and 80% or less, of the widths $W_{23}$ of the specific rib portions 230 in which these recessed portions 232 are present, for example.

Since the depth $d_{23}$ is smaller than the depths $d_{21}$ and $d_{22}$, the flowability of the electrolyte solution is not likely to be hindered, and thus the electrolyte solution can be retained while good flowability is ensured. The depth $d_{23}$ may be 5% or more and 90% or less, or 10% or more and 80% or less, or 15% or more and 70% or less, of the maximum depth (here, depths $d_{21}$ and $d_{22}$) of the groove portions 20, for example. Depending on the thickness of the bipolar plate 2, the depth $d_{23}$ may be 0.1 mm or more and 10 mm or less, or 1 mm or more and 5 mm or less, for example.

If the minimum width (here, width $W_{23}$) of the specific rib portions 230 is larger than or equal to the minimum opening width (here, groove widths $W_{21}$ and $W_{22}$) of the groove portions 20, the specific rib portions 230 can be easily provided with larger recessed portions 232 or a larger number of recessed portions 232. Therefore, the amount of retained electrolyte solution can be easily increased, and the electrolyte solution can easily diffuse to the electrode 13, thus making it easy to increase the discharge capacity. The minimum width of the specific rib portions 230 may be larger than or equal to 1.2 times, or 1.5 times, or double, or 2.5 times, or 3 times the minimum opening width of the groove portions 20, for example. If the widths of the specific rib portions 230 are excessively large, the number of groove portions 20 may decrease. Therefore, the minimum width of the specific rib portions 230 may be smaller than or equal to 10 times, or 8 times, or 5 times the minimum opening width of the groove portions 20.

One specific rib portion 230 can include, as the recessed portions 232, both a major recessed portion in which the circumferential length of the edge of the opening provided in the contact surface 231 is relatively long and a minor recessed portion in which the circumferential length is relatively short. However, when the total of the circumferential lengths of the recessed portions 232 in one specific rib portion 230 is set to be constant, it is preferable to provide a plurality of minor recessed portions rather than a single major recessed portion. When a plurality of minor recessed portions are provided, the contact surface 231 and the recessed portions 232 are likely to be present in the specific rib portion 230 with better balance compared with a case where a single major recessed portion is provided. Therefore, it is though that, when a plurality of minor recessed portions are provided, the electrolyte solution can more easily diffuse to the electrode 13, and in addition, the electron transfer between the contact surface 231 and the electrode 13 can be easily promoted. In a quantitative manner, the total of the circumferential lengths of the recessed portions 232 present in one specific rib portion 230 may be larger than or equal to ¼ of the length of that specific rib portion 230. The larger the above-mentioned total of the circumferential lengths is, the more easily the number of recessed portions 232 present in one specific rib portion 230 can be increased, and the more easily the above-described effect of improving the diffusibility of the electrolyte solution and effect of favorably transferring electrons can be obtained. Accordingly, it is preferable that the above-mentioned total of the circumferential lengths is larger than or equal to ½ of the length of the specific rib portion 230.

It should be noted that the length of the specific rib portion 230 may be the length in the direction in which the rib portion 23 is formed (in this embodiment, the direction in which the electrolyte solution flows). The length of the specific rib portion 230 herein is the maximum distance L (see FIG. 1B) in the direction in which the rib portion 23 is formed in a range in which the introduction groove 21 and the discharge groove 22 that are present in the interdigitated region 25 and adjacent to each other are overlap each other. When the recessed portions 232 are not open to the groove portions 20, the circumferential length of the edge of the opening of each recessed portion 232 refers to the length of the edge of the opening provided in the contact surface 231. When the recessed portions 232 are open to the groove portions 20 (see Embodiment 3, which will be described later), the circumferential length of the edge of the opening of each recessed portion 232 refers to the total of the length of the edge of the opening of the recessed portion 232 that overlaps the edge of the opening of the groove portion 20 (in FIG. 5, which will be described later, a portion corresponding to a chord subtending an arc that is a portion of the recessed portion 232), and the length of the edge of the opening present in the contact surface 231, when the bipolar plate 2 is viewed in a plan view.

When a plurality of recessed portions 232 are provided in one specific rib portion 230, the amount of retained electrolyte solution can be easily increased, and the electrolyte solution can easily diffuse to the electrode 13, compared with a case where only one recessed portion 232 is provided. When a plurality of recessed portions 232 are provided at regular intervals, the electrolyte solution can easily diffuse to the electrode 13 in a uniform manner, the contact surface 231 can be secured between the adjacent recessed portions 232, and electrons can be favorably delivered to and received from the electrode 13. When the electrode 13 is arranged opposite to the bipolar plate 2 in which a plurality of such specific rib portions 230 are provided, the electrolyte solution can easily diffuse to the entire electrode 13. Thus, the discharge capacity can be more easily increased.

When the bipolar plate 2 includes a plurality of specific rib portions 230, and each of the specific rib portions 230 includes a plurality of recessed portions 232, it is preferable that at least one of the specific rib portions 230 is a rib portion 23 provided in the direction in which the electrolyte solution flows as shown in FIG. 1A, and includes a plurality of recessed portions 232 that are spaced apart from one another in the direction in which the electrolyte solution flows. The reason for this is that, in this case, the following effects can be obtained in addition to the effect of increasing the amount of retained electrolyte solution, the effect of improving the diffusibility of the electrolyte solution to the electrode 13, and the effect of improving the electron transfer to and from the electrode 13, as described above. In this case, the electrode 13 arranged opposite to the bipolar plate 2 can include, in the direction in which the electrolyte solution flows, regions in which the electrolyte solution diffuses, the regions corresponding to the recessed portions 232 provided in the direction in which the electrolyte solution flows. Therefore, with an RF battery including this bipolar plate 2, the battery reaction can be caused more reliably and more efficiently, and as a result, the discharge capacity can be easily increased. In addition, in this case, the groove portions 20 separated by the specific rib portions 230 are also provided in the direction in which the electrolyte solution flows, and the flowability of the electrolyte solution is good. The interval between the adjacent recessed portions 232 can be selected as appropriate as long as the contact surface 231 can be appropriately secured.

When the introduction grooves 21 and the discharge grooves 22 are provided, it is preferable that a region (specific uneven region 24) in which the specific rib portion 230 is interposed between an introduction groove 21 and a discharge groove 22, which are adjacently arranged, is provided.

When the interdigitated region 25 is provided, it is preferable that more than half or all of the rib portions 23 provided in the interdigitated region 25 are the specific rib portions 230. That is, it is preferable that, as shown in the example in FIG. 1A, the specific rib portions 230 separate the introduction grooves 21 and the discharge grooves 22, which are adjacently aligned in parallel. The reason for this is that, when the interdigitated region 25 is provided, the electrolyte solution can be efficiently supplied to the electrode 13, the electrolyte solution can be efficiently discharged from the electrode 13, and the battery reaction can be efficiently caused, as described above. In addition, when the specific uneven region 24 is provided in at least a portion of the interdigitated region 25, the electrolyte solution is also supplied from the recessed portions 232 of the bipolar plate 2 to the rib-facing regions of the electrode 13 that corresponds to the specific rib portions 230, and thus the electrolyte solution can easily diffuse, thus making it possible to more efficiently cause the battery reaction. Furthermore, the specific rib portions 230 also include the contact surfaces 231, and thus the electrons can be favorably transferred between the contact surfaces 231 and the electrode 13. With an RF battery including such a bipolar plate 2, the discharge capacity can be easily increased. It should be noted that, although a configuration is possible in which some of the rib portions 23 provided in the interdigitated region 25 are not the specific rib portions 230, it is preferable that all of the rib portions 23 provided in the interdigitated region 25 are the specific rib portions 230, in other words, the specific uneven regions 24 are provided all over the interdigitated region 25, as in this embodiment.

In the case where the specific uneven regions 24 are provided, when the ratio of the recessed portions 232 in the specific rib portion 230 interposed between an introduction groove 21 and a discharge groove 22 is relatively large, the effect of improving the diffusibility of the electrolyte solution due to the above-described flow rate adjustment being achieved by providing the recessed portions 232 can be more reliably obtained. When the ratio of the recessed portions 232 is relatively small, a decrease in the contact surfaces 231 due to the recessed portions 232 being provided can be prevented, the rib-facing regions of the electrode 13 can be appropriately secured, and thus electrons can be favorably transferred between the contact surfaces 231 and the electrode 13. In a quantitative manner, in one specific rib portion 230, the ratio of the total area $S_{232}$ of all of the recessed portions 232 present in this specific rib portion 230 in a plan view to the total area Sa of the contact surface 231 and all of the recessed portions 232 in a plan view, namely $(S_{232}/Sa) \times 100$, may be 5% or more and 70% or less, for example.

The larger the above-mentioned area ratio is, the more easily the above-described effect of improving the diffusibility of the electrolyte solution can be obtained. The smaller the above-mentioned area ratio is, the more easily the above-described favorable electron transfer can be performed.

From these viewpoints, the above-mentioned area ratio may be 10% or more and 60% or less, or 15% or more and 50% or less. It should be noted that the above-mentioned total area Sa in a plan view refers to the total of the area in the range in which the introduction groove 21 and the discharge groove 22 overlap each other in a plan view and the area of the recessed portions 232 in a plan view, in a rib portion 23 separating the groove portions 20. In FIG. 1A, the rib portion 23 excluding the recessed portions 232 in the above-mentioned total area Sa in a plan view is indicated by cross-hatching of a two-dot chain line.

Arrangement of Recessed Portions on Front and Back Surfaces

The bipolar plate 2 may have any of the following forms.

(α) A plurality of groove portions 20 and the rib portions 23 including the specific rib portions 230 are provided on one of the front and back surfaces of the bipolar plate 2, and the groove portions 20 and the rib portions 23 are not provided on the other surface.

(β1) The groove portions 20 and the rib portions 23 are provided on both the front and back surfaces of the bipolar plate 2. The specific rib portions 230 are provided on one surface, and the specific rib portions 230 are not provided on the other surface.

(β2) The groove portions 20 and the rib portions 23 including the specific rib portions 230 are provided on both the front and back surfaces of the bipolar plate 2.

All of the above-described forms can be used in a single-cell battery including only one battery cell 10C (FIGS. 7 to 9, which will be described later), and a multicellular battery including a plurality of battery cells 10C. In particular, the bipolar plate 2 having the form (α) or the form (β1) may be used as a current collector to be arranged at an end in the stacking direction in a single-cell battery or multicellular battery. In this case, when a configuration is obtained in which a stack obtained by arranging a positive electrode 14 (FIG. 7, which will be described later) and a negative electrode 15 (FIG. 7, which will be described later) on the front and back sides of the membrane 11 is interposed between two bipolar plates 2, each of the bipolar plates 2 is assembled such that a surface provided with a plurality of groove portions 20 and the rib portions 23 including the specific rib portions 230 is opposite to the electrode 13. In particular, a bipolar plate 2 having the form (β2) may be used in a multicellular battery. In this case, the electrolyte solution can easily diffuse to both the electrode 13 (e.g., positive electrode 14) arranged on one surface of the bipolar plate 2 and the electrode 13 (e.g., negative electrode 15) arranged on the other surface of the bipolar plate 2.

Constituent Material

As the material constituting the bipolar plate 2 of Embodiment 1, a conductive material having small electric resistance that does not react with the electrolyte solution and has resistance (e.g., chemical resistance and acid resistance) against the electrolyte solution can be favorably used. Regarding the electric resistance, the volume specific resistivity in the thickness direction of the bipolar plate 2 is preferably 100 mΩ·cm or lower, more preferably 50 mΩ·cm or lower, and even more preferably 10 mΩ·cm or lower. Furthermore, a constituent material having a suitable rigidity is preferable because the shapes and dimensions of the groove portions 20 and the recessed portions 232 are not likely to change over a long period of time, and the above-described effects due to the groove portions 20 and the recessed portions 232 being provided can be easily maintained.

Specific examples of the material constituting the bipolar plate 2 include the following materials (a) to (c).

(a) One type of conductive material selected from (1) to (4) below.

(b) A composite material containing a plurality of types of conductive materials selected from (1) to (4) below.

(c) An organic composite material containing an organic material and at least one type of conductive material selected from (1) to (4) below.

(1) A compound containing at least one type of metal selected from Ru, Ti, Ir, and Mn.

(2) One type of metal selected from Pt, Au, and Pd.

(3) A conductive polymer.

(4) At least one type of carbon-based material selected from graphite, vitreous carbon, conductive diamond, conductive diamond-like carbon (DLC), carbon black, carbon nano-tubes, and carbon fibers.

Examples of the organic material of (c) above include thermoplastic resins, polyolefin-based organic compounds, and chlorinated organic compounds. A so-called conductive plastic can be used as the organic composite material of (c) above. Examples of the above-described organic composite material include mixtures of a conductive material and an organic material as well as materials obtained by coating a substrate made of the above-mentioned organic material with the conductive polymer of (3).

The bipolar plate 2 of Embodiment 1 can be manufactured by molding the above-mentioned constituent material into a plate shape using a known method (e.g., injection molding, press molding, and vacuum molding, in a case of conductive plastic) and forming the groove portions 20 and the recessed portions 232. The productivity of the bipolar plate 2 is good when the groove portions 20 and the recessed portions 232 are formed simultaneously. The groove portions 20 and the recessed portions 232 can also be formed by cutting a plate material that does not include at least one of the groove portion 20 and the recessed portion 232.

Major Effects

The bipolar plate 2 of Embodiment 1 includes a plurality of groove portions 20, and therefore, when it is used as a constituent element of an RF battery, the electrolyte solution can be efficiently supplied to the electrode 13, the electrolyte solution can be efficiently discharged from the electrode 13, and the battery reaction can be efficiently caused on the electrode 13. The flowability of the electrolyte solution is good, thus making it possible to reduce a pump loss and the like. In addition, the bipolar plate 2 of Embodiment 1 includes the specific rib portions 230 including the contact surfaces 231 that come into contact with the electrode 13, and the recessed portions 232, and therefore, when it is used as a constituent element of an RF battery, the electrolyte solution can easily diffuse to the electrode 13, the battery reaction can be efficiently caused, and electrons can be favorably delivered to and received from the electrode 13. With an RF battery including this bipolar plate 2 of Embodiment 1, the discharge duration can be increased, and the discharge capacity can be increased, compared with a case where no specific rib portions 230 are provided.

In particular, since the bipolar plate 2 of this embodiment has the configuration as described below, the discharge capacity can be easily increased. This effect will be specifically described in Test Example, which will be described later.

(A) A plurality of groove portions 20 and a plurality of rib portions 23 extend in the direction in which the electrolyte solution flows, and furthermore, these are aligned in parallel in a direction orthogonal to the direction in which the electrolyte solution flows.

(B) The specific uneven region 24 in which the introduction groove 21, the specific rib portion 230, and the discharge groove 22 are aligned is included, and the rib portion 23 separating the introduction groove 21 and the discharge groove 22 that are adjacent to each other is the specific rib portion 230.

(C) The plurality of groove portions 20 form an interdigitated region 25 in which the introduction grooves 21 and the discharge grooves 22 are alternately arranged, and the interdigitated region 25 includes the specific uneven region 24 and a plurality of specific rib portions 230.

(D) The recessed portions 232 are not open to the groove portions 20.

(E) Each of the specific rib portions 230 includes a plurality of recessed portions 232 that are spaced apart from one another in the direction in which the electrolyte solution flows.

Other Bipolar Plates

Hereinafter, bipolar plates 2A and 2B of Embodiments 2 and 3 will be described with reference to FIGS. 3 to 6.

Figure 3:
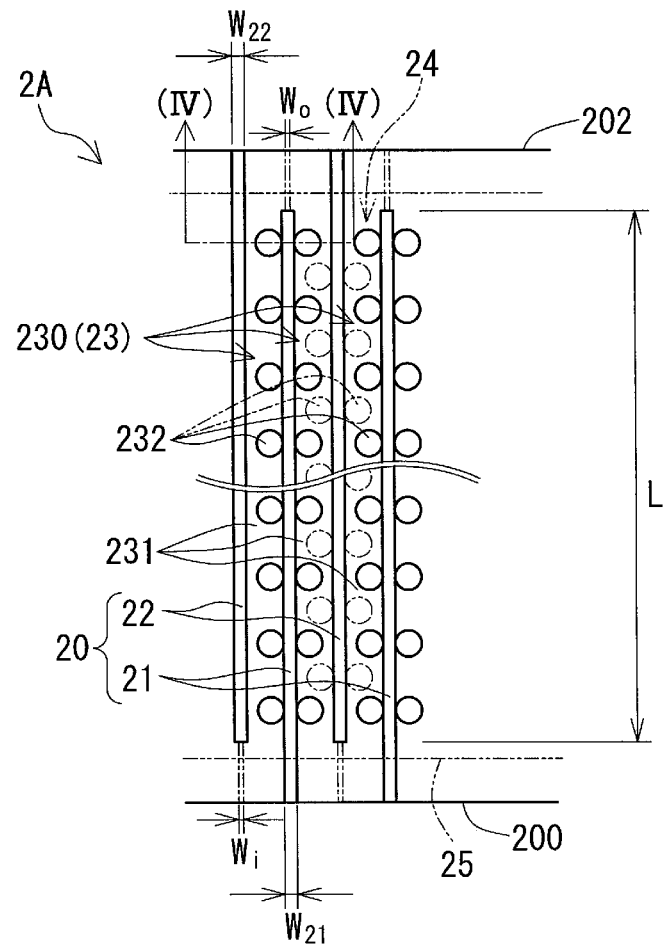
FIG. 3 is a partial plan view showing a portion of a bipolar plate of Embodiment 2.
Figure 5:
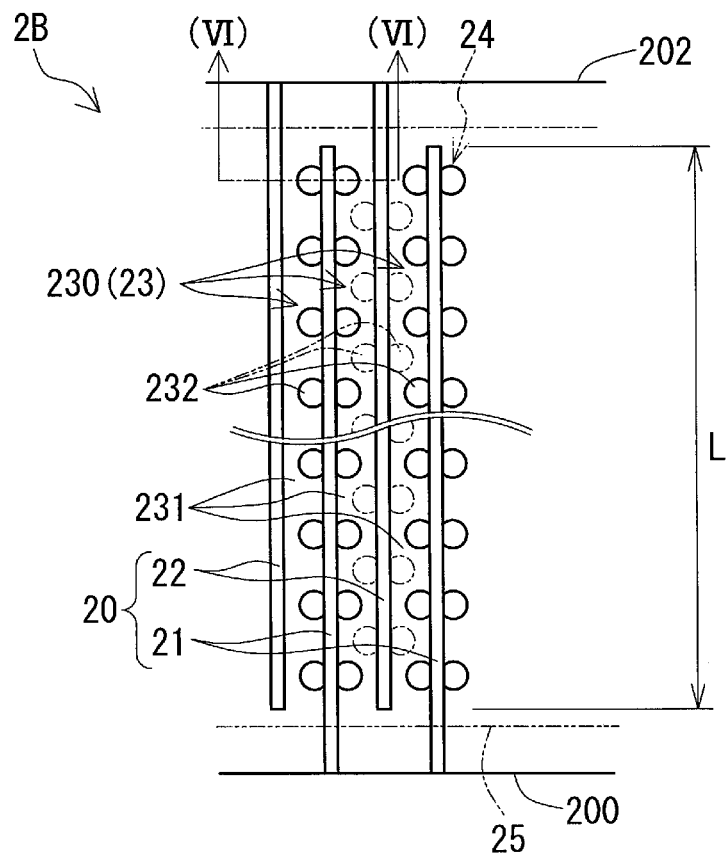
FIG. 5 is a partial plan view showing a portion of a bipolar plate of Embodiment 3.

FIGS. 3 and 5 show only portions of the internal regions to be exposed from the window portion of the frame body 120 (FIG. 8) in the bipolar plates 2A and 2B, and the peripheral regions to be covered with the frame body 120 are omitted.

The basic configurations of the bipolar plates 2A and 2B of Embodiments 2 and 3 are similar to that of the bipolar plate 2 of Embodiment 1. Each of them includes a plurality of groove portions 20 and rib portions 23, and the specific rib portions 230 including the contact surface 231 that comes into contact with the electrode 13 (FIGS. 4 and 6) and a plurality of recessed portions 232. One of the differences of Embodiments 2 and 3 from Embodiment 1 is that the edges of the openings of the recessed portions 232 in the contact surface 231 are in contact with (in the case of the bipolar plate 2A of Embodiment 2) or intersect (in the case of the bipolar plate 2B of Embodiment 3) the edges of the openings of the groove portions 20. Hereinafter, differences of Embodiments 2 and 3 from Embodiment 1 will be described in detail, and a specific description of configurations, effects, and the like that are the same as those of Embodiment 1 will be omitted.

It should be noted that a case is shown where both the bipolar plates 2A and 2B of the embodiments include the introduction grooves 21 and the discharge grooves 22 as well as the specific uneven regions 24 and the interdigitated region 25, but this configuration can be changed as appropriate. In addition, a case is shown where the introduction grooves 21 and the discharge grooves 22 are provided extending in the direction in which the electrolyte solution flows, and are respectively closed-terminal-end grooves and closed-leading-end grooves having an elongated rectangular shape in a plan view, but this configuration can be changed as appropriate. Regarding the shape, size, and the like of the recessed portions 232, it is sufficient that Embodiment 1 is referred to.

Figure 4:
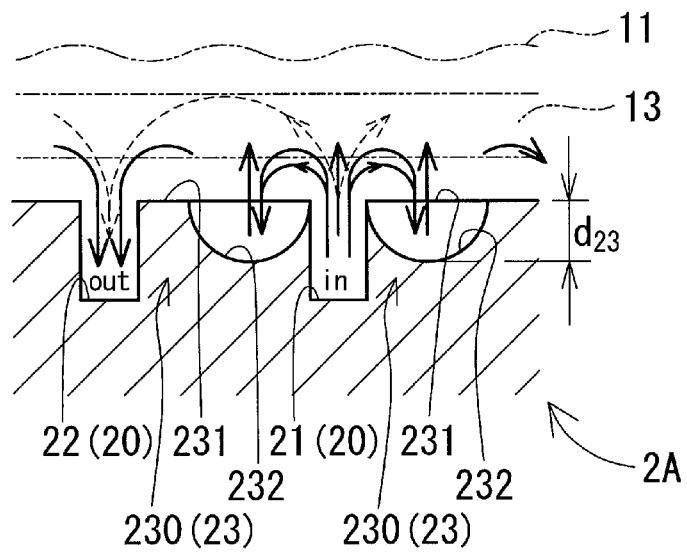
FIG. 4 is a schematic partial cross-sectional view of the bipolar plate of Embodiment 2 taken along line (IV)-(IV) shown in FIG. 3.

FIG. 3 shows, as the bipolar plate 2A of Embodiment 2, an example in which the recessed portions 232 having a circular shape in a plan view are provided to come into line contact with portions (peripheral edges formed by lateral walls extending in the vertical direction in FIG. 3) of the edges of the openings of the groove portions 20 (here, introduction grooves 21), the portions extending in the direction in which the electrolyte solution flows. Since portions of the edges of the openings of the introduction grooves 21 are in contact with portions of the edges of the openings of the recessed portions 232 in the contact surfaces 231, the inner circumferential surfaces of the recessed portions 232 and the inner peripheral surfaces of the lateral walls forming the introduction grooves 21 are close to each other as shown in FIG. 4. Therefore, it is thought that, as indicated by solid line arrows in FIG. 4, the recessed portions 232 can easily receive the electrolyte solution from the introduction grooves 21, and the electrolyte solution can be easily supplied from the recessed portions 232 to the electrode 13, compared with Embodiment 1 (FIG. 2). Since the recessed portions 232 are provided to not come into contact with the discharge grooves 22 but with the introduction grooves 21 in this embodiment, it is expected that the electrolyte solution supplied from the introduction grooves 21 can easily diffuse from the recessed portions 232 to the electrode 13. In addition, since the recessed portions 232 are provided on two sides of each introduction groove 21 such that the introduction groove 21 is interposed between the recessed portions 232, and the recessed portions 232 are symmetrically arranged with respect to the introduction groove 21, it is expected that the electrolyte solution can easily diffuse to the electrode 13. The same applies to the bipolar plate 2B of Embodiment 3, which will be described later.

Figure 6:
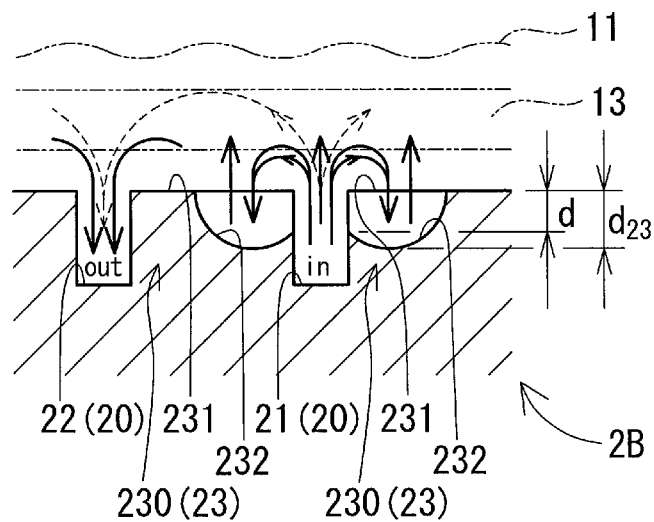
FIG. 6 is a schematic partial cross-sectional view of the bipolar plate of Embodiment 3 taken along line (VI)-(VI) shown in FIG. 5.

FIG. 5 shows, as the bipolar plate 2B of Embodiment 3, an example in which the recessed portions 232 are open to the groove portions 20 (here, introduction grooves 21), and the edges of the openings of the recessed portions 232 are provided in the contact surfaces 231 and the inner peripheral surfaces of the groove portions 20. Since the recessed portions 232 are open to the introduction grooves 21, the internal spaces of the recessed portions 232 are in communication with the internal spaces of the introduction grooves 21 as shown in FIG. 6. Therefore, it is thought that, as indicated by solid line arrows in FIG. 6, the recessed portions 232 can easily receive the electrolyte solution from the introduction grooves 21, and the electrolyte solution can be easily supplied from the recessed portions 232 to the electrode 13, compared with the above-described Embodiment 2. Since the recessed portions 232 of this embodiment are not open to the discharge grooves 22 but to the introduction grooves 21, it is expected that the electrolyte solution supplied from the introduction grooves 21 can easily diffuse from the recessed portions 232 to the electrode 13. When the recessed portions 232 are open to the groove portions 20, the maximum depth $d_{23}$ of the recessed portions 232 is adjusted such that the electrolyte solution can be temporarily retained in the recessed portions 232. Specifically, as shown in FIG. 6, the maximum depth $d_{23}$ may be adjusted so as to be larger than the maximum depth d of the edges of the openings of the recessed portions 232 formed in the inner peripheral surfaces of the groove portions 20.

It should be noted that the arrangement positions, number, and the like of the recessed portions 232 in Embodiments 2 and 3 are merely exemplary and can be changed as appropriate.

For example, when the recessed portions 232 are provided on two sides of one groove portion 20 such that the groove portion 20 is interposed between the recessed portions 232, positions on one side at which the recessed portions 232 are arranged may be shifted in the flowing direction from positions on the other side at which the recessed portions 232 are arranged, or the shape or size of the recessed portions 232 on one side may be different from the shape or size of the recessed portions 232 on the other side.

Alternatively, for example, the recessed portions 232 may be provided at the discharge grooves 22 instead of or in addition to the introduction grooves 21. In FIGS. 3 and 5, the recessed portions 232 provided at the discharge grooves 22 are virtually indicated by a two-dot chain line. FIGS. 3 and 5 show examples in which the introduction grooves 21 and the discharge grooves 22 are independently provided with the recessed portions 232 such that the recessed portions 232 come into contact with or intersect them, and each of the recessed portions 232 that come into contact with or intersect the discharge grooves 22 is provided between two recessed portions 232 that come into contact with or intersect an introduction groove 21 and are adjacent to each other in the longitudinal direction.

In addition, as a modified example of Embodiment 3, a configuration may also be employed in which connection grooves (not shown) that each connect the recessed portion 232 shown in FIG. 1A and the groove portion 20 are separately provided between the recessed portions 232 and the groove portions 20, and the connection grooves are open to the groove portions 20. The connection grooves may be linear grooves having a groove width that is smaller than or equal to the diameters of the recessed portions 232 having a circular shape in a plan view, for example.

Cell Frame, Battery Cell, Cell Stack, RF Battery

A cell frame 12 of an embodiment, a battery cell 10C of an embodiment, a cell stack 30 of an embodiment, and an RF battery 10 of an embodiment will be described with reference to FIGS. 7 to 9.

Figure 7:
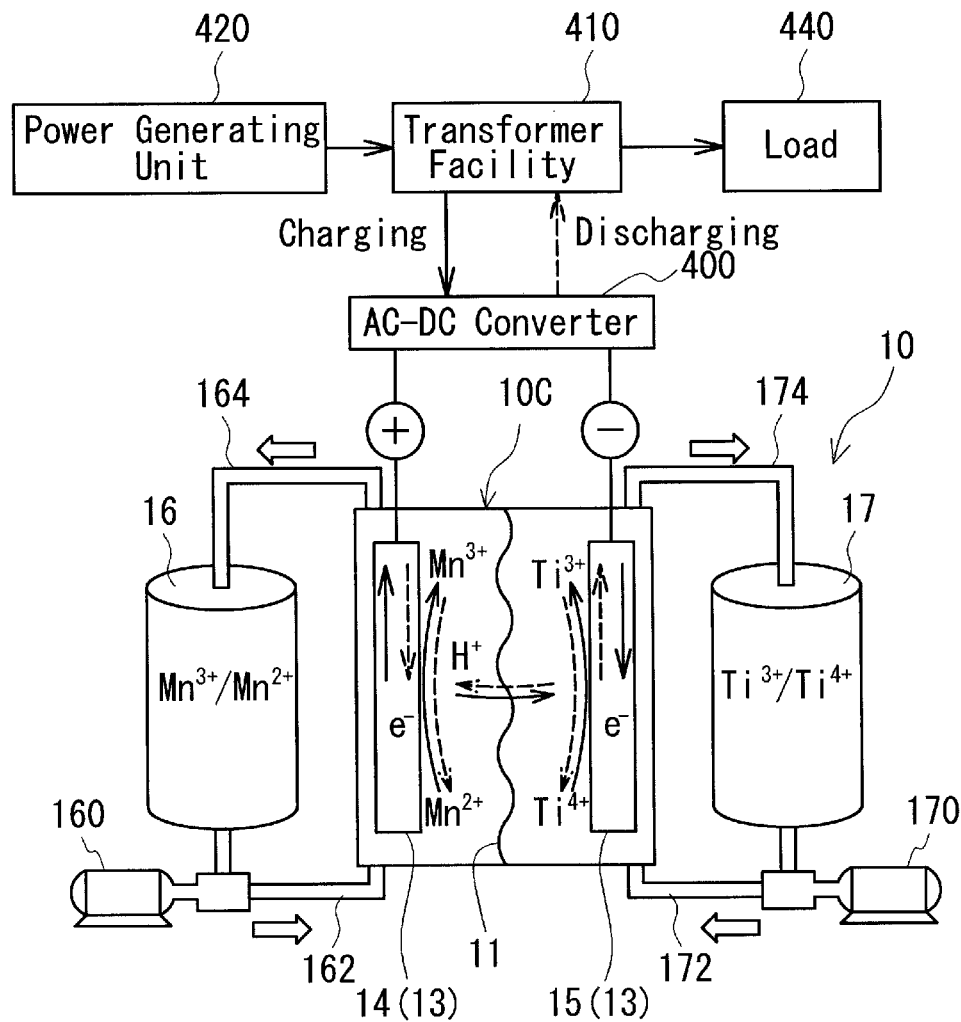
FIG. 7 is an explanatory diagram showing a basic configuration and a basic operating principle of a redox flow battery of an embodiment.
Figure 9:
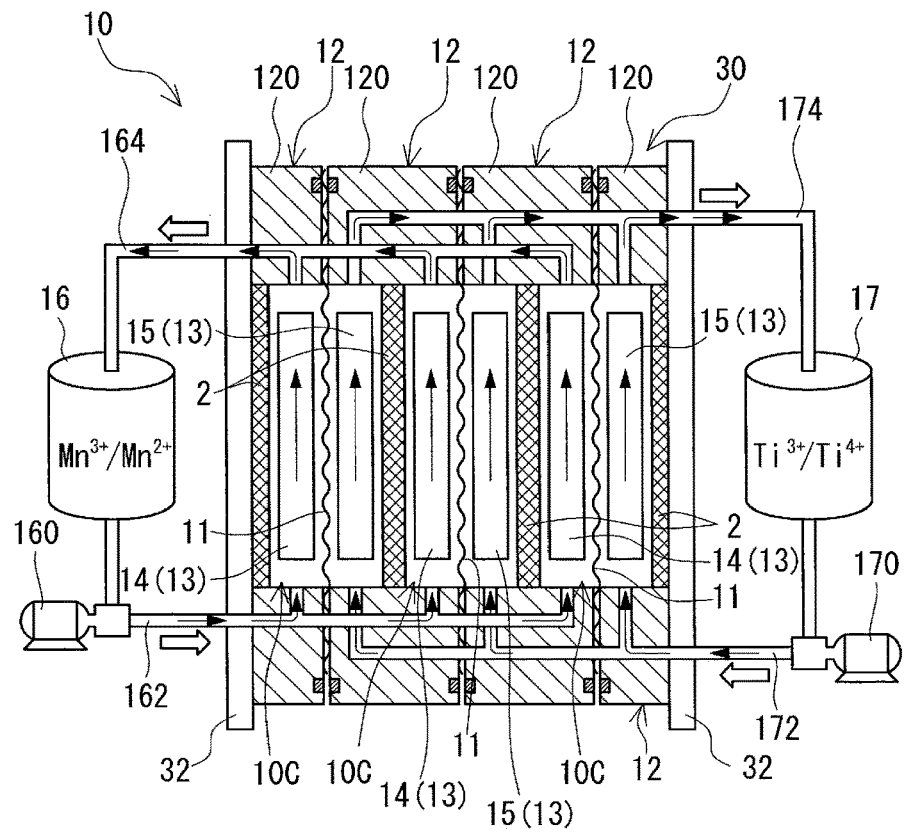
FIG. 9 is an explanatory diagram showing a schematic configuration of a redox flow battery including the cell stack of the embodiment.

Ions shown in a positive electrode tank 16 and a negative electrode tank 17 in FIGS. 7 and 9 are examples of ionic species contained in electrolyte solutions for an electrode. In FIG. 7, solid line arrows mean charging, and broken line arrows mean discharging.

Figure 8:
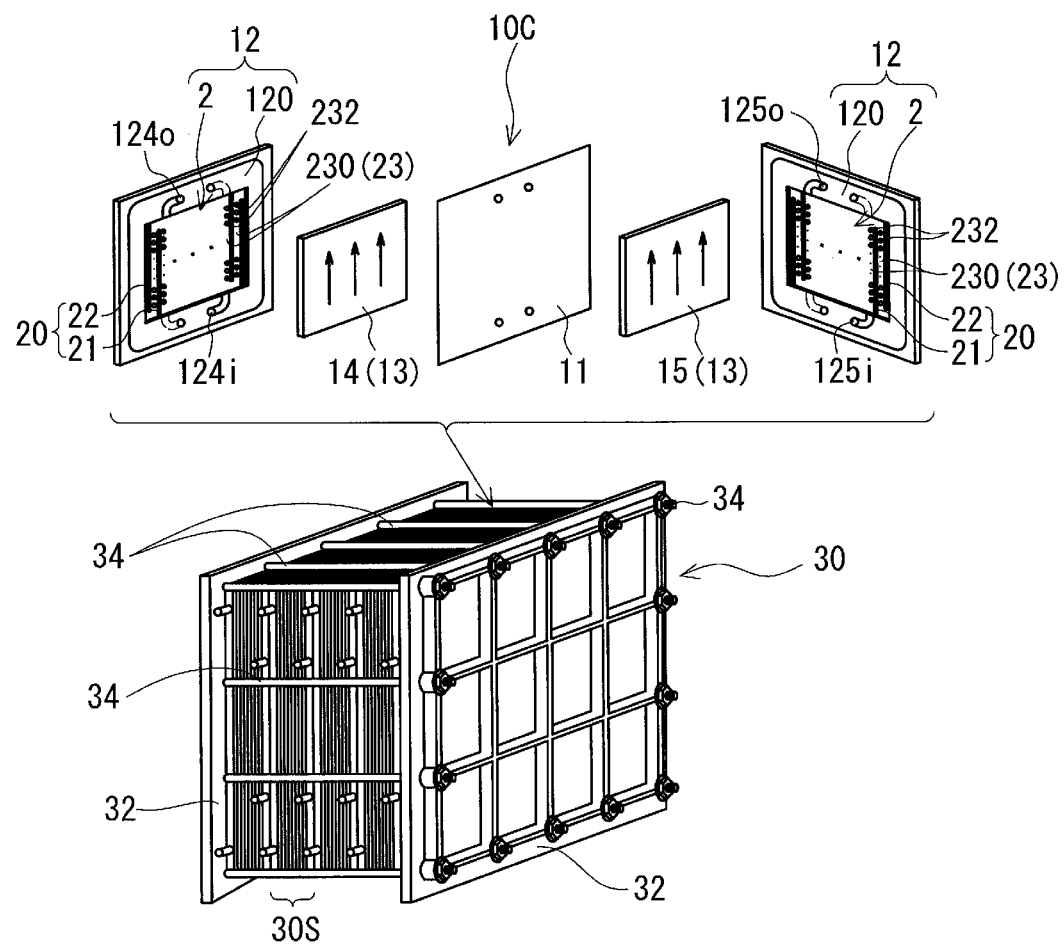
FIG. 8 is a schematic configuration diagram showing a cell frame including the bipolar plate of Embodiment 1 and an example of a cell stack of an embodiment.

The cell frame 12 of this embodiment is typically used as a constituent element of an RF battery, and includes a bipolar plate 2 and a frame body 120 provided on the outer periphery of the bipolar plate 2 as shown in FIG. 8. In particular, the cell frame 12 of this embodiment includes the bipolar plate 2 of the above-described embodiment including a plurality of groove portions 20 and the rib portions 23 including the specific rib portions 230. Although the case where the cell frame 12 of this embodiment includes the bipolar plate 2 of Embodiment 1 is described, the bipolar plates 2A and 2B of Embodiments 2 and 3 may also be included.

The battery cell 10C of this embodiment includes the cell frames 12 of the embodiment and electrodes 13 (a positive electrode 14, a negative electrode 15).

The cell stack 30 of this embodiment includes the battery cell 10C of the embodiment. As shown in FIGS. 8 and 9, this cell stack 30 is a multilayer stack obtained by stacking a plurality of battery cells 10C, and includes the cell frame 12 of the embodiment as a constituent element of at least one battery cell 10C.

The RF battery 10 of this embodiment is a single-cell battery (FIG. 7) including a single battery cell 10C of the embodiment, or a multicellular battery (FIGS. 8 and 9) including the cell stack 30 of the embodiment.

More specific description will be given below.

Outline of RF Battery

As shown in FIG. 7, the RF battery 10 includes the battery cell 10C and a circulation mechanism for circulating electrolyte solutions and supplying the electrolyte solutions to the battery cell 10C. Typically, the RF battery 10 is connected to a power generating unit 420 and a load 440 such as an electric power system or a consumer via an AC-DC converter 400, a transformer facility 410, and the like, and is charged by using the power generating unit 420 as a power supply source and discharges electricity to the load 440 as a power supply target. Examples of the power generating unit 420 include a solar power generator, a wind power generator, and other common power plants.

Basic Configuration of RF Battery

Battery Cell

As shown in FIG. 7, the battery cell 10C includes a positive electrode 14 to which a positive-electrode electrolyte is supplied, a negative electrode 15 to which a negative-electrode electrolyte is supplied, a membrane 11 interposed between the positive electrode 14 and the negative electrode 15, and two bipolar plates 2 (FIG. 8) between which the positive electrode 14 and the negative electrode 15 sandwiching the membrane 11 are interposed.

The positive electrode 14 and the negative electrode 15 are reaction sites in which battery reactions using active materials (ions) contained in the electrolyte solutions for an electrode are caused. An example of the constituent materials of the electrodes 13 is one type of material selected from (1) to (7) below.

(1) A dimensionally stable electrode (DSE) made of a carbon woven fabric containing at least one type of metal selected from Ru, Ti, Ir, and Mn, and one type of metal oxide selected from $TiO_2$, $RuO_2$, $IrO_2$, and $MnO_2$.

(2) One type of metal selected from Pt, Au, and Pd.

(3) A conductive polymer.

(4) At least one type of carbon-based material selected from graphite, vitreous carbon, conductive diamond, and conductive diamond-like carbon (DLC).

(5) A non-woven fabric or woven fabric made of carbon fibers.

(6) A non-woven fabric or woven fabric made of cellulose.

(7) Carbon paper made of carbon fibers and a conductive assistant.

A porous material such as the above-described non-woven fabric (fiber assembly) made of carbon fibers has pores, and thus the flowability of the electrolyte solution is good.

The electrodes 13 may have a thickness of 50 μm or more and 1 mm or less, for example. When the electrodes 13 have a thickness in this range, a thin battery cell 10C and a thin cell stack 30 can be formed. Moreover, when the electrodes 13 have a thickness in the above-mentioned range, the thickness of the battery cell 10C is not excessively large, thus making it less likely that the conductive resistance is increased. In addition, the electrodes 13 are not excessively thin, and therefore, the electrolyte solution can easily flow and a pressure loss is less likely to be caused while the area for the battery reaction is appropriately secured. The thicknesses of the electrodes 13 can be set to 100 μm or more and 800 μm or less, or 200 μm or more and 700 μm or less. If it is desired to further reduce the thickness, the thicknesses of the electrodes 13 can be set to 500 μm or less.

The membrane 11 is a member that separates the positive electrode 14 and the negative electrode 15 and is permeable to predetermined ions, and an ion-exchange membrane, a porous membrane, or the like can be used, for example.

Cell Frame

As described above, the cell frames 12 include the bipolar plate 2 and the frame body 120, and form a space in which the electrodes 13 are housed and the electrolyte solution flows. A single-cell battery includes two cell frames 12. A multicellular battery includes a plurality of pairs of cell frames 12.

The bipolar plate 2 is as described above.

The frame body 120 is a member that supports the bipolar plate 2 and is used to supply the electrolyte solution to the electrode 13 arranged on the bipolar plate 2 and discharge the electrolyte solution from the electrode 13. FIG. 8 shows a rectangular frame provided with a rectangular window portion (penetrated portion) at the center as an example of the frame body 120. The frame body 120 is provided with a supply passage for an electrolyte solution and a discharge passage for an electrolyte solution. The supply passage is provided with a supply hole (124*i* for the positive electrode, and 125*i* for the negative electrode), a slit extending from the supply hole to the window portion, and the like. The discharge passage is provided with a discharge hole (124*o* for the positive electrode, and 125*o* for the negative electrode), a slit extending from the window portion to the discharge hole, and the like. The supply edge 200 (FIG. 1A) and its vicinity of the bipolar plate 2 is arranged so as to come into contact with the inner peripheral edge of the frame body 120 that is continuous with the above-mentioned supply passage. In addition, the discharge edge 202 (FIG. 1A) and its vicinity of the bipolar plate 2 is arranged so as to come into contact with the inner peripheral edge of the frame body 120 that is continuous with the above-mentioned discharge passage.

A rectifying groove (not shown) can be provided between the above-described slit and the inner peripheral edge of the window portion. For example, in FIG. 8, a rectifying groove on the supply side may be provided along the lower edge of the window portion, and a rectifying groove on the discharge side may be provided along the upper edge of the window portion. If the rectifying grooves are provided, the electrode solution can be easily introduced and discharged uniformly in the width direction of the bipolar plate 2 and the electrode 13 (the direction extending along the lower edge or upper edge in FIG. 8). A configuration is also possible in which the rectifying grooves are not provided in the frame body 120, and rectifying grooves (not shown) are provided in the bipolar plate 2 as described above. In this case, the rectifying grooves may be provided along the supply edge 200 (FIG. 1A) and the discharge edge 202 (FIG. 1A) of the bipolar plate 2.

A configuration may be employed in which the frame body 120 includes two frame body pieces obtained by dividing the frame body 120 in the thickness direction, and the frame body pieces are arranged on the front and back sides of the bipolar plate 2 to interpose the peripheral edge region of the bipolar plate 2 therebetween and support it, for example. The two frame body pieces between which the bipolar plate 2 is interposed are joined to each other as appropriate. In this case, the peripheral edge region of the bipolar plate 2 is covered by the region near the inner peripheral edge of the frame body pieces, and the remaining region (internal region) of the bipolar plate 2 is exposed from the window portion. When the bipolar plate 2 includes the above-described groove portions 20 and rib portions 23 including the specific rib portions 230, it is preferable that these groove portions 20 and the rib portions 23 are provided in the internal region to be exposed from the window portion of the frame body 120. In this case, it is preferable that the sizes of the groove portions 20, the sizes of the rib portions 23, the size of the interdigitated region 25, and the like are adjusted according to the size of the region to be exposed.

Typically, the frame body 120 is made of a resin having resistance against the electrolyte solution and good electrical insulating properties, or the like.

Cell Stack

As shown in FIGS. 8 and 9, the cell stack 30 includes a stack obtained by stacking the cell frame 12 (bipolar plate 2), the positive electrode 14, the membrane 11, and the negative electrode 15 in this order multiple times, two end plates 32 between which the stack is interposed, coupling members 34 such as long bolts that couple the end plates 32, and fastening members such as nuts. Due to the end plates 32 being fastened by the fastening members, the stacking state of the stack is maintained with a fastening force in the stacking direction.

In some cases, a predetermined number of battery cells 10C are used to form a sub cell stack 30S, and a plurality of sub cell stacks 30S are stacked and used as the cell stack 30.

The frame bodies 120 on which current collectors are arranged are used in the cell frames positioned at two ends of the sub cell stack 30S or cell stack 30 in the stacking direction of the battery cell 10C. For example, the current collector may be obtained by stacking the bipolar plate 2 and a metal plate made of copper or the like.

A sealing member is arranged between the adjacent frame bodies 120, and thus the stack is kept liquid tight.

Circulation Mechanism

As shown in FIGS. 7 and 9, the circulation mechanism includes the positive electrode tank 16 for retaining the positive-electrode electrolyte to be circulated and supplied to the positive electrode 14, the negative electrode tank 17 for retaining the negative-electrode electrolyte to be circulated and supplied to the negative electrode 15, pipes 162 and 164 that connect the positive electrode tank 16 and the battery cell 10C (cell stack 30), pipes 172 and 174 that connect the negative electrode tank 17 and the battery cell 10C (cell stack 30), and pumps 160 and 170 that are provided in the pipes 162 and 172 located on sides from which the electrolyte solutions are supplied to the battery cell 10C. The pipes 162, 164, 172, and 174 are connected to pipe lines or the like for flowing the electrolyte solutions that include the supply holes 124$i$ and 125$i$ and the discharge holes 124$o$ and 125$o$ of the stacked multiple cell frames 12, and form the circulation routes for the electrolyte solutions for an electrode.

Regarding the basic configurations, materials, and the like of the RF battery 10 and the cell stack 30, known configurations, materials, and the like can be referred to.

Specific Example of Configuration of RF Battery

When the RF battery 10 of the embodiment is a single-cell battery, a configuration is employed in which at least one of the two cell frames 12 included in the battery cell 10C includes the bipolar plate 2 of the embodiment. It is preferable that both of the cell frames 12 include the bipolar plate 2 of the embodiment because both of the electrolyte solutions for an electrode can easily diffuse, the battery reactions can be efficiently caused on both of the electrodes, and thus the discharge capacity can be improved. In this case, the bipolar plate 2 of the embodiment may have any of the above-described forms (α), (β1), and (β2).

When the RF battery 10 of the embodiment is a multi-cellular battery, a configuration is employed in which at least one of the cell frames 12 includes the bipolar plate 2 of the embodiment. In this case, it is preferable that the bipolar plate 2 of the embodiment has the above-described form (β2). The reason for this is that it is preferable to use such a bipolar plate 2 because both of the electrolyte solutions for an electrode can easily diffuse, the battery reactions can be efficiently caused on both of the electrodes, and thus the discharge capacity can be improved. It is more preferable that substantially all of the cell frames 12 include the bipolar plate 2 having the form (β2).

Electrolyte Solution

Solutions containing ions serving as active materials are used as the electrolyte solutions. Typically, solutions containing metal ions serving as active materials and an acid such as sulfuric acid are used.

The positive-electrode electrolyte contains at least one of a manganese ion, a vanadium ion, an iron ion, a polyoxometalate, a quinone derivative, and an amine as a positive-electrode active material, for example.

The negative-electrode electrolyte contains at least one of a titanium ion, a vanadium ion, a chromium ion, a polyoxometalate, a quinone derivative, and an amine as a negative-electrode active material, for example.

In the RF battery 10 of the embodiment, electrolyte solutions containing various active materials listed above can be used. Even when any electrolyte solution is used, it is expected that the electrolyte solution can more easily diffuse, the battery reaction can be more efficiently caused, and the discharge capacity is larger, compared with the case where no specific rib portions 230 are included, because the RF battery 10 of the embodiment includes the bipolar plate 2 of the embodiment. In particular, when the RF battery 10 of the embodiment includes the positive-electrode electrolyte containing manganese ions as the positive-electrode active material, and the negative-electrode electrolyte containing titanium ions as the negative-electrode active material, the discharge duration is long even when electricity is discharged with a high output, and the discharge capacity is large (see Test Example, which will be described later).

The concentration of the positive-electrode active material and the concentration of the negative-electrode active material can be selected as appropriate. For example, at least one of the concentration of the positive-electrode active material and the concentration of the negative-electrode active material may be 0.3 M or more and 5 M or less. The above-mentioned unit "M" for the concentration refers to the molar concentration and means "mol/liter".

Major Effects

The cell frame 12 of the embodiment, the battery cell 10C of the embodiment, and the cell stack 30 of the embodiment include the bipolar plate 2 of the embodiment, and therefore, when they are used as a constituent element of an RF battery, the electrolyte solutions can be efficiently supplied to the electrodes 13, the electrolyte solutions can be efficiently discharged from the electrodes 13, the battery reactions can be efficiently caused on the electrode 13, and a pump loss and the like can be reduced. In addition, with the cell frame 12 of the embodiment, the battery cell 10C of the embodiment, and the cell stack 30 of the embodiment, the electrolyte solutions can easily diffuse to the electrodes 13, the battery reactions can be more efficiently caused, electrons can be favorably transferred between the bipolar plates 2 and the electrodes 13, and the discharge capacity can be increased.

The RF battery 10 of the embodiment includes the battery cell 10C of the embodiment or the cell stack 30 of the embodiment, and therefore, the electrolyte solutions can be efficiently supplied to the electrodes 13, the electrolyte solutions can be efficiently discharged from the electrodes 13, the battery reactions can be efficiently caused on the electrodes 13, and a pump loss and the like can be reduced. In addition, with the RF battery 10 of the embodiment, the electrolyte solutions can easily diffuse to the electrodes 13, the battery reactions can be more efficiently caused, electrons can be favorably received from and delivered to the electrodes 13, and the discharge capacity can be increased compared with a case where bipolar plates provided with no specific rib portions 230 are included. These effects will be specifically described in Test Example below.

Test Example 1

An RF battery including a bipolar plate provided with the specific rib portion and an RF battery including a bipolar plate provided with no specific rib portion were formed, and their discharge durations were examined.

The bipolar plates included in the RF batteries produced in this test had the same specifications, except for the presence or absence of the specific rib portion. The specifications of the bipolar plates are shown below.

Specifications of Bipolar Plate

The shape of a region to be exposed from the frame body of the cell frame in a plan view: A horizontally elongated rectangle The direction in which the electrolyte solution flows: A direction extending along the short side of the above-mentioned horizontally elongated rectangle Groove portions: A plurality of groove portions that extend in the direction in which the electrolyte solution flows and have an elongated rectangular shape in a plan view are arranged in parallel in a direction extending along the long side of the bipolar plate at regular intervals. Introduction grooves and discharge grooves are included among the groove portions, and an interdigitated region in which the introduction grooves and the discharge grooves are alternately arranged is provided. The groove portions have the same groove length, groove depth, and cross-sectional shape.

Rib portions: A plurality of rib portions that each separate the introduction groove and the discharge groove that are adjacent to each other, extend in the direction in which the electrolyte solution flows, and have an elongated rectangular shape in a plan view are arranged in parallel in a direction extending along the long side of the bipolar plate at regular intervals. The minimum width of the rib portions is larger than the minimum width of the openings of the groove portions. Here, the minimum width of the rib portions is smaller than or equal to five times the minimum width of the openings of the groove portions.

In a bipolar plate of Sample No. 1 including the specific rib portion, all of the rib portions that each are interposed between an introduction groove and a discharge groove include a plurality of recessed portions that are spaced apart from one another in the direction in which the electrolyte solution flows at regular intervals. That is, portions interposed between the introduction grooves and the discharge grooves that are adjacently arranged are the specific rib portions, and the rib portions in the interdigitated region are the specific rib portions. Here, one specific rib portion includes 10 or more and 20 or less recessed portions, and the recessed portions are not open to the introduction groove and the discharge groove. In one specific rib portion, the ratio of the total area of all of the recessed portions to the total area of the contact surface and all of the recessed portions in a plan view is about 17%, and the total of the circumferential lengths of all of the recessed portions is about 87% of the length of the specific rib portion. The recessed portions have the same shape and size. The maximum depth of the recessed portion is 50% of the groove depths of the introduction grooves and the discharge grooves, and is 8% of the thickness of the bipolar plate. The diameter of the opening of the recessed portion is about 77% of the width of the specific rib portion, and is smaller than the maximum depth of the recessed portion. The length of the specific rib portion is 10 cm or more and 15 cm or less, and the number of the specific rib portions is 30 or more and 40 or less. The shape of such a bipolar plate of Sample No. 1 in a plan view is similar to that shown in FIG. 1A described above. Here, the bipolar plate provided with recessed portions on the front and back surfaces was prepared.

In a bipolar plate of Sample No. 101 including no specific rib portions, all of the rib portions include no recessed portions, and regions of the rib portions that are to be opposite to the electrode are constituted by a flat surface.

The positive-electrode electrolyte contained manganese ions as the positive-electrode active material. The negative-electrode electrolyte contained titanium ions as the negative-electrode active material. Both the concentration of manganese ions and the concentration of titanium ions were 0.3 M or more and 5 M or less.

In this test, a single-cell battery including two cell frames provided with the bipolar plate of Sample No. 1 was prepared. For comparison, a single-cell battery including two cell frames provided with the bipolar plate of Sample No. 101 was prepared. Here, both of the single-cell batteries had a so-called zero-gap configuration in which the electrodes are in close contact with the membrane. In both of the single-cell batteries, the electrodes had an area of 250 cm$^2$. The electrodes had a thickness of 700 µm.

Figure 10:
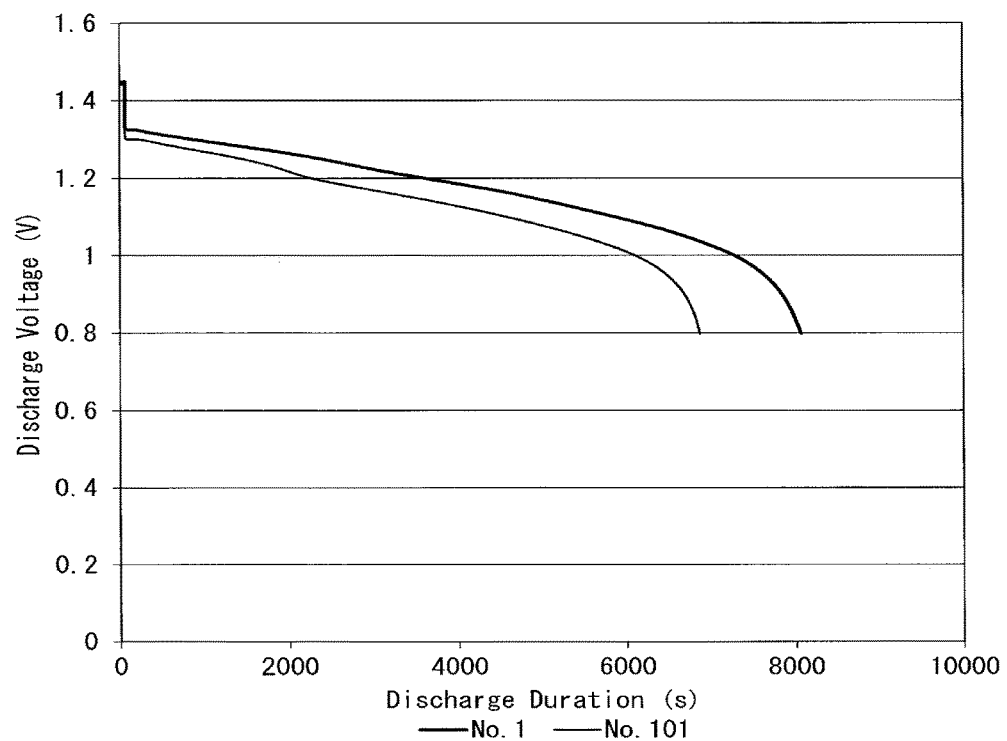
FIG. 10 is a graph showing the relationship between the discharge duration (s) and the discharge voltage (V) in sample redox flow batteries of Test Example 1.

The prepared sample RF batteries were used to discharge electricity at a constant electric current density with the initial discharge voltage being set to 1.45V, and the discharge duration until the voltage decreased to 0.8 V was measured. FIG. 10 shows the results. Here, the electric current density was set to 144 mA/cm$^2$, and an adjustment was made such that the quantity of flow of the electrolyte solution was 1.2 ml/min with respect to 1 cm$^2$ of the electrode.

In the graph shown in FIG. 10, the horizontal axis indicates the discharge duration (s), and the vertical axis indicates the discharge voltage (V). As shown in FIG. 10, the discharge duration of the RF battery of Sample No. 1 (thick solid line) including the bipolar plate provided with the specific rib portions was longer than that of the RF battery of Sample No. 101 (thin solid line) including the bipolar plate provided with no specific rib portions. Here, the discharge duration of the RF battery of Sample No. 101 was about 6870 seconds, whereas the discharge duration of the RF battery of Sample No. 1 was longer than 8060 seconds, which increased by a factor of greater than 1.15 times. In particular, in this test, the electric current density was as large as 144 mA/cm$^2$, and electricity was discharged with a high output, but the discharge duration increased. These results were obtained from the single-cell batteries, but it is expected that multicellular batteries have a similar tendency.

It was shown from the results of this test that, with an RF battery including a bipolar plate provided with the above-described multiple groove portions and rib portions among which the specific rib portions provided with the recessed portions are included, the discharge duration can be increased and the discharge capacity can be increased, compared with the case where only the multiple groove portions are included.

Modified Examples

At least one of the following modifications can be implemented in the bipolar plates 2, 2A, and 2B of Embodiments 1 to 3, the cell frame 12 of the embodiment, the battery cell 10C of the embodiment, the cell stack 30 of the embodiment, and the RF battery 10 of the embodiment.

(1) The shape of the internal region of the bipolar plate to be exposed from the frame body 120 in a plan view is changed.

For example, at least a portion of the peripheral edge of the bipolar plate may be curved (e.g., an elliptical shape, a racetrack shape, and the like), and the internal region may have a polygonal shape such as a hexagon or an octagon.

(2) The shape of the groove portions 20 in a plan view and the shape of the rib portions 23 in a plan view are changed.

For example, thick portions and thin portions may be locally formed in the groove portions 20 and the rib portions 23 due to the groove widths $W_{21}$ and $W_{22}$ and the widths of the rib portions 23 varying from portion to portion, and the groove portions 20 and the rib portions 23 may have a meandering shape such as a wave shape or a zigzag shape. In addition, the widths of the groove portions 20 and the rib portions 23 may decrease from one end to the other end (i.e., tapered shape).

(3) The cross-sectional shape of the groove portions 20 is changed.

Examples thereof include a semicircular arc shape, a V shape, a U shape, a trapezoidal shape (i.e., the width of the opening of the groove is larger than the width of the bottom surface), and a dovetail shape (i.e., the width of the opening of the groove is smaller than the width of the bottom surface).

(4) A plurality of introduction grooves 21 and a plurality of discharge grooves 22 are included, but they are not alternately arranged.

For example, a group of the introduction grooves 21 and a group of the discharge grooves 22 may be alternately arranged.

(5) The shape of the recessed portions 232 in a plan view and the cross-sectional shape of the recessed portions 232 are changed.

Examples of the shape in a plan view include a rectangular shape (including a square shape) and an elliptical shape. Examples of the cross-sectional shape include a rectangular shape, a V shape, and a U shape.

(6) When one specific rib portion 230 includes a plurality of recessed portions 232, at least one of the shape in a plan view, the cross-sectional shape, and the dimensions is different between at least one of the recessed portions 232 and the others.

(7) When one specific rib portion 230 includes a plurality of recessed portions 232, all of the intervals between the adjacent recessed portions 232 are not uniform, and at least one of them are different from the others.

For example, a configuration may be employed in which, in the specific rib portion 230, the recessed portions 232 are densely provided in regions near the supply edge 200 and the discharge edge 202, and the recessed portions 232 are sparsely provided in an intermediate region that is spaced apart from the edges 200 and 202.

(8) A plurality of rib portions 23 are provided, and some of the rib portions 23 are the specific rib portions 230 and the others include no recessed portions 232.

For example, the specific rib portions 230 and the rib portions 23 including no recessed portions 232 may be alternately provided.

The present invention is not limited to these embodiments and is defined by the scope of the appended claims, and all changes that fall within the same essential spirit as the scope of the claims are intended to be included therein.

LIST OF REFERENCE NUMERALS 2, 2A, 2B Bipolar plate
20 Groove portion, 21 Introduction groove, 22 Discharge groove
23 Rib portion
230 Specific rib portion, 231 Contact surface, 232 Recessed portion
24 Specific uneven region
25 Interdigitated region
200 Supply edge, 202 Discharge edge
10 Redox flow battery (RF battery)
10C Battery cell
11 Membrane, 13 Electrode, 14 Positive electrode, 15 Negative electrode 16 Positive electrode tank, 17 Negative electrode tank
160, 170 Pump, 162, 164, 172, 174 Pipe
12 Cell frame
120 Frame body, 124i, 125i Supply hole, 124o, 125o Discharge hole
30 Cell stack
30S Sub cell stack, 32 End plate, 34 Coupling member
400 AC-DC converter, 410 Transformer facility, 420 Power generating unit, 440 Load

The invention claimed is:

1. A bipolar plate to be arranged opposite to an electrode that is supplied with an electrolyte solution to cause a battery reaction, the bipolar plate comprising:
   a plurality of groove portions in which the electrolyte solution flows and rib portions that each separate the plurality of groove portions on at least one of its front and back surfaces,
   wherein
      a specific rib portion including a contact surface to be brought into contact with the electrode and one or more recessed portions that are open in the contact surface is included among the rib portions,
      the bipolar plate is configured such that the electrolyte solution can be temporarily retained in the one or more recessed portions for facilitating a dispersion of the electrolyte solution from the bipolar plate to the electrode, and
      a maximum depth of each of the one or more recessed portions is:
         in the range of from 1 mm to 5 mm, and
         5% or more and 90% or less of a maximum depth of the plurality of groove portions.

2. The bipolar plate according to claim 1,
   wherein one or more of the plurality of groove portions are introduction grooves for introducing the electrolyte solution and rest of the plurality of groove portions are discharge grooves for discharging the electrolyte solution, and
   a region in which one of the introduction grooves, the specific rib portion, and one of the discharge grooves are aligned in this order is provided.

3. The bipolar plate according to claim 2,
   wherein, in the specific rib portion interposed between the one of the introduction grooves and the one of the discharge grooves, a ratio of a total area of all of the one or more recessed portions present in this specific rib portion in a plan view to a total area of the contact surface and all of the one or more recessed portions in a plan view is 5% or more and 70% or less.

4. The bipolar plate according to claim 2, comprising an interdigitated region in which the introduction grooves and the discharge grooves are alternately arranged,
   wherein the specific rib portion is included among the rib portions in the interdigitated region.

5. The bipolar plate according to claim 1,
   wherein a recessed portion that is not open to the plurality of groove portions is included among the one or more recessed portions.

6. The bipolar plate according to claim 1,
   wherein the one or more recessed portions are a plurality of recessed portions provided in the specific rib portion, and a total of a circumferential lengths of the plurality of recessed portions is longer than or equal to ¼ of a length of the specific rib portion.

7. The bipolar plate according to claim 1,
   wherein the one or more recessed portions are a plurality of recessed portions provided in the specific rib portion, the specific rib portion is provided in a direction in which the electrolyte solution flows, and the plurality of recessed portions are spaced apart from one another in the direction in which the electrolyte solution flows.

8. The bipolar plate according to claim 1,
   wherein a minimum width of the specific rib portion is larger than or equal to a minimum width of openings of the plurality of groove portions.

9. A cell frame comprising the bipolar plate according to claim 1, and a frame body provided on an outer periphery of the bipolar plate.

10. A battery cell comprising the cell frame according to claim 9, and an electrode.

11. The battery cell according to claim 10,
    wherein the electrode has a thickness of 50 μm or more and 1 mm or less.

12. A cell stack comprising the battery cell according to claim 10.

13. A redox flow battery comprising the battery cell according to claim 10.

14. The redox flow battery according to claim 13, comprising a positive-electrode electrolyte containing at least one of a manganese ion, a vanadium ion, an iron ion, a polyoxometalate, a quinone derivative, and an amine as a positive-electrode active material.

15. The redox flow battery according to claim 13, comprising a negative-electrode electrolyte containing at least one of a titanium ion, a vanadium ion, a chromium ion, a polyoxometalate, a quinone derivative, and an amine as a negative-electrode active material.

16. A redox flow battery comprising the cell stack according to claim 12.

* * * * *